United States Patent
Obata et al.

(10) Patent No.: US 12,418,893 B2
(45) Date of Patent: Sep. 16, 2025

(54) WIRELESS COMMUNICATION SYSTEM, BASE STATION, AND NON-TRANSITORY COMPUTER-READABLE STORAGE MEDIUM

(71) Applicant: KABUSHIKI KAISHA TOSHIBA, Tokyo (JP)

(72) Inventors: Haruka Obata, Ota Tokyo (JP); Toshihisa Nabetani, Kanagawa (JP); Kabuto Arai, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 292 days.

(21) Appl. No.: 18/180,499

(22) Filed: Mar. 8, 2023

(65) Prior Publication Data
US 2024/0031992 A1 Jan. 25, 2024

(30) Foreign Application Priority Data
Jul. 22, 2022 (JP) .................................. 2022-117095

(51) Int. Cl.
*H04W 72/02* (2009.01)
*H04W 72/0446* (2023.01)

(52) U.S. Cl.
CPC ....... *H04W 72/02* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 12,293,262 B1* | 5/2025 | Olgiati | G06N 20/00 |
| 2018/0083817 A1 | 3/2018 | Salem et al. | |
| 2019/0021108 A1* | 1/2019 | Hampel | H04W 72/535 |
| 2020/0077436 A1 | 3/2020 | Singh et al. | |
| 2022/0104237 A1* | 3/2022 | Muruganathan | H04L 5/0051 |
| 2022/0225345 A1* | 7/2022 | Liu | H04W 72/51 |
| 2022/0322362 A1* | 10/2022 | Muruganathan | H04L 5/0053 |
| 2023/0047726 A1* | 2/2023 | Xu | H04W 72/20 |
| 2023/0276467 A1 | 8/2023 | Obata et al. | |

FOREIGN PATENT DOCUMENTS

| | | |
|---|---|---|
| JP | 2019534593 A | 11/2019 |
| JP | 6976920 B2 | 11/2021 |
| JP | 2023123991 A | 9/2023 |
| WO | 2018036545 A1 | 3/2018 |

OTHER PUBLICATIONS

Japanese Decision to Grant a Patent (and an English language translation thereof) dated Jul. 1, 2025, issued in counterpart Japanese Application No. 2022-117095.

* cited by examiner

Primary Examiner — Chirag G Shah
(74) Attorney, Agent, or Firm — Holtz, Holtz & Volek PC

(57) ABSTRACT

According to one embodiment, a wireless communication system includes a base station, a first allocation determination device, and a second allocation determination device. The base station is capable of wirelessly communicating with terminal devices each having either a first characteristic or a second characteristic. The first allocation determination device determines allocation of communication resources to at least one of the terminal devices. The second allocation determination device determines allocation of communication resources to at least another one of the terminal devices.

13 Claims, 13 Drawing Sheets

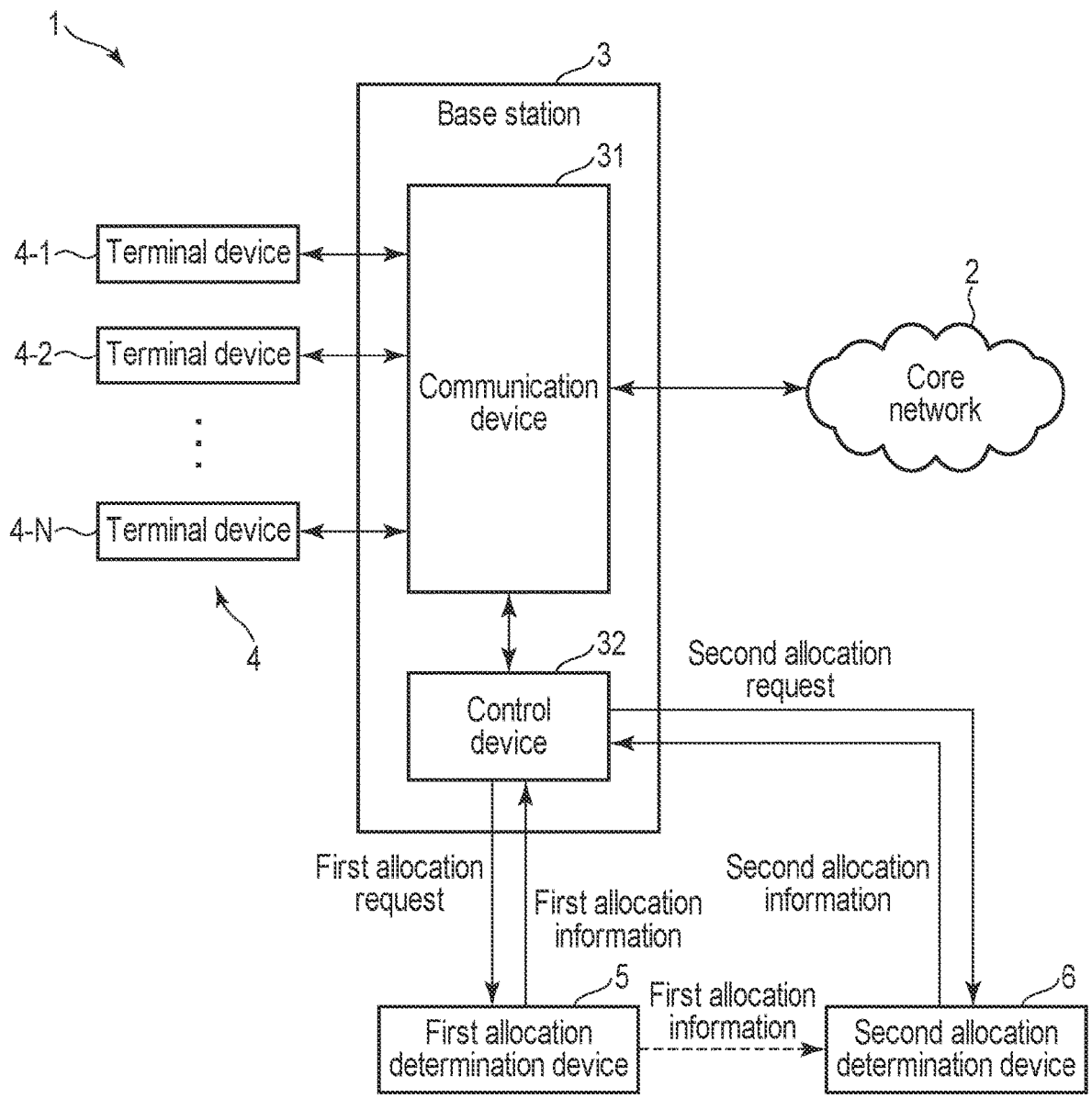
F I G. 1

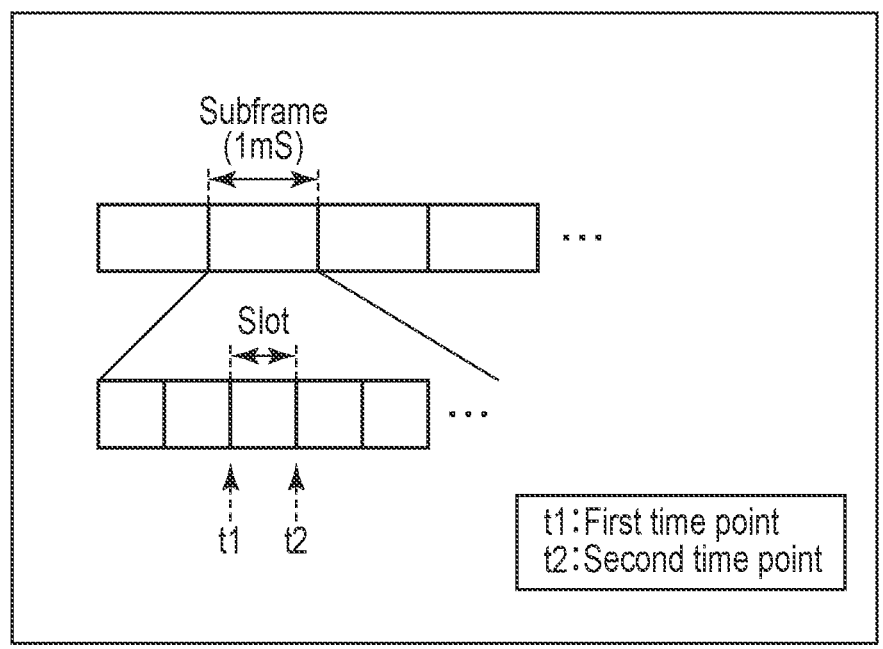
F I G. 11

WIRELESS COMMUNICATION SYSTEM, BASE STATION, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2022-117095, filed Jul. 22, 2022, the entire contents of which are incorporated herein by reference.

FIELD

Embodiments described herein relate generally to a wireless communication system, a base station, and a non-transitory computer-readable storage medium.

BACKGROUND

In the Third Generation Partnership Project (3GPP (registered trademark)), a 5th generation mobile communication system (5G mobile communication system) has been studied. In the 5G mobile communication system, it is assumed that everything is connected to a network. In addition, the 5G mobile communication system is required to satisfy a wide range of requirements regarding wireless communication. The requirements regarding wireless communication are, for example, requirements regarding speed, capacity, reliability, and latency.

The 5G mobile communication system includes a base station and terminal devices. The base station determines which of resources (communication resources) regarding wireless communication are to be allocated to which of the terminal devices. The terminal devices each perform wireless communication with the base station by using the allocated communication resources.

The 5G mobile communication system may include various types of terminal devices with different requirements regarding wireless communication. For example, a certain terminal device requires wireless communication with a large capacity. Further, another terminal device requires wireless communication with a low latency.

BRIEF DESCRIPTION OF THE DRAWINGS

FIG. 1 is a block diagram illustrating a configuration example of a wireless communication system according to an embodiment.

FIG. 11 is a view illustrating a setting example of a first time point and a second time point in the wireless communication system according to the embodiment.

DETAILED DESCRIPTION

Figure 2:
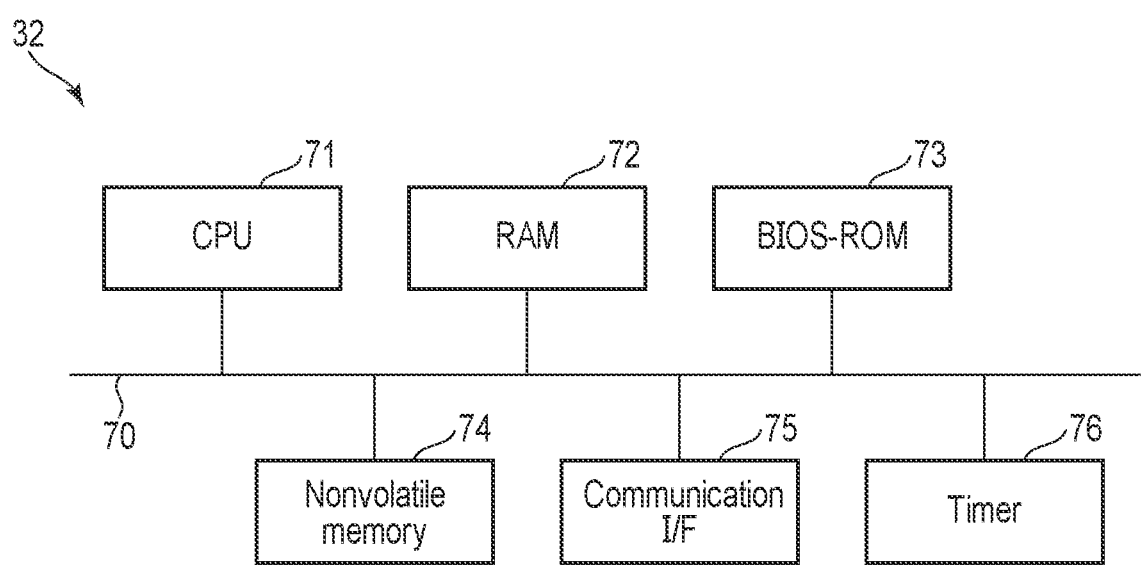
FIG. 2 is a block diagram illustrating a hardware configuration example of a control device of the wireless communication system according to the embodiment.

In general, according to one embodiment, a wireless communication system includes a base station, a first allocation determination device, and a second allocation determination device. The base station is capable of wirelessly communicating with a plurality of terminal devices each having either a first characteristic or a second characteristic. The first allocation determination device determines allocation of communication resources to at least one of the plurality of terminal devices. The second allocation determination device determines allocation of communication resources to at least another one of the plurality of terminal devices. The base station determines, based on a slot length, a first execution period for determining allocation of communication resources to a first group to which one or more terminal devices each having the first characteristic belong, and a second execution period for determining allocation of communication resources to a second group to which one or more terminal devices each having the second characteristic belong. The first allocation determination device notifies the base station of first allocation information based on a first policy within the first execution period. The first allocation information indicates communication resources to be allocated to each of the one or more terminal devices belonging to the first group. The second allocation determination device notifies the base station of second allocation information based on a second policy and the first allocation information within the second execution period after the base station is notified of the first allocation information. The second allocation information indicates communication resources to be allocated to each of the one or more terminal devices belonging to the second group. The base station allocates communication resources to each of the one or more terminal devices belonging to the first group, based on the first allocation information. The base station allocates communication resources to each of the one or more terminal devices belonging to the second group, based on the second allocation information.

Various embodiments will be described hereinafter with reference to the accompanying drawings.

FIG. 1 is a block diagram illustrating a configuration example of a wireless communication system 1 according to an embodiment. The wireless communication system 1 is, for example, a wireless communication system that conforms to the $5^{th}$ generation mobile communication system (5G system) standardized in 3GPP.

A radio signal used in the 5G system is a modulated signal modulated by orthogonal frequency-division multiplexing (OFDM) and employing mixed-numerology. The OFDM is a modulation scheme capable of transferring data in parallel on multiple carrier waves that are orthogonal. Each of the carrier waves is referred to as a subcarrier. The modulated signal employing the mixed-numerology is a signal whose subcarrier spacing is changeable. The subcarrier spacing is a spacing between adjacent subcarriers (that is, an interval in a frequency direction).

In the 5G system, a modulated signal is transferred by radio waves by using massive multiple-input and multiple-output (MIMO). Massive MIMO is a technology for transferring signals with multiple antennas in both transmission and receiving.

The wireless communication system 1 includes, for example, a core network 2, a base station 3, a plurality of terminal devices 4, a first allocation determination device 5, and a second allocation determination device 6.

The core network 2 is a backbone communication network in the 5G system. Multiple base stations including the base station 3 may be connected to the core network 2. The core network 2 relays transfer of data (for example, packets) between the connected base station 3 and another base station 3. Another network may be connected to the core network 2. In that case, the core network 2 relays transfer of data between the base station 3 and the other network.

The base station 3 is, for example, a wireless communication device conforming to the 5G system. The base station 3 is connected to the core network 2. Further, the base station 3 is capable of wirelessly communicating with each of the plurality of terminal devices 4. More specifically, the base station 3 is capable of transmitting a modulated signal that is defined by the 5G system, to each of the plurality of terminal devices 4. The base station 3 is capable of receiving a modulated signal that is defined by the 5G system, from each of the plurality of terminal devices 4. Thus, the base station 3 may relay transfer of data between the core network 2 and each of the plurality of terminal devices 4.

Each of the plurality of terminal devices 4 is, for example, a wireless communication device conforming to the 5G system. The plurality of terminal devices 4 are, for example, N terminal devices 4-1, 4-2, 2, . . . , and 4-N. N is an integer equal to or greater than one. Hereinafter, any one of the plurality of terminal devices 4 may be referred to as a terminal device 4.

The terminal device 4 is owned by a user. To the terminal device 4, identification information (for example, number) that can uniquely identify the terminal device 4 is assigned. The terminal device 4 is portable by the user. The terminal device 4 may be fixed at a certain place. The terminal device 4 is capable of wirelessly communicating with the base station 3. More specifically, the terminal device 4 is capable of transmitting a modulated signal that is defined by the 5G system, to the base station 3. The terminal device 4 is capable of receiving a modulated signal that is defined by the 5G system, from the base station 3.

The plurality of terminal devices 4 may have different characteristics regarding wireless communication. The characteristics regarding wireless communication are, for example, requirements regarding wireless communication. The requirements regarding wireless communication are, for example, requirements regarding speed, capacity, reliability, and latency. Specifically, the plurality of terminal devices 4 include, for example, a terminal device of enhanced mobile broadband (eMBB), a terminal device of Ultra-Reliable and Low Latency Communications (URLLC), and a terminal device of massive Machine Type Communication (mMTC). The terminal device 4 of eMBB requires high-speed and large-capacity wireless communication. The terminal device 4 of URLLC requires ultra-reliable and low-latency wireless communication. The terminal device 4 of mMTC requires wireless communication in which many terminals are simultaneously connected.

The first allocation determination device 5 is, for example, an information processing device. The first allocation determination device 5 is connected to the base station 3 via, for example, a network or a cable. The first allocation determination device 5 may be built in the base station 3. The first allocation determination device 5 determines allocation of communication resources to at least one of the plurality of terminal devices 4. More specifically, the first allocation determination device 5 determines, in accordance with a request (first allocation request) from the base station 3, communication resources to be allocated to each of one or more terminal devices 4 that belong to a first group and to which communication resources are to be allocated at a certain time point. The terminal devices 4 belonging to the first group are, for example, terminal devices 4 of URLLC. The first allocation determination device 5 transmits information (first allocation information) that indicates the allocated communication resources, to the base station 3. The first allocation determination device 5 may further transmit the first allocation information to the second allocation determination device 6. In this case, the first allocation determination device 5 is connected to the second allocation determination device 6 via, for example, a network or a cable.

The second allocation determination device 6 is, for example, an information processing device. The second allocation determination device 6 is connected to the base station 3 via, for example, a network or a cable. The second allocation determination device 6 may be built in the base station 3. The second allocation determination device 6 determines allocation of communication resources to at least one terminal device 4 that is different from the terminal device 4 to which the allocation of communication resources is determined by the first allocation determination device 5 among the plurality of terminal devices 4. More specifically, the second allocation determination device 6 determines, in accordance with a request (second allocation request) from the base station 3, communication resources to be allocated to each of one or more terminal devices 4 that belong to a second group and to which communication resources are to be allocated at a certain time point. The terminal devices 4 belonging to the second group are, for example, terminal devices 4 of eMBB. The second allocation determination device 6 uses the first allocation information acquired by the first allocation determination device 5 to determine the allocation of communication resources. The first allocation information is included in the second allocation request, for example. The first allocation information may be received from the first allocation determination device 5. The second allocation determination device 6 transmits information (second allocation information) that indicates the allocated communication resources, to the base station 3.

The first allocation determination device 5 and the second allocation determination device 6 determine allocation of communication resources to two groups of terminal devices 4, respectively, which have different requirements regarding wireless communication. This makes it possible to determine allocation of communication resources satisfying the requirements while reducing an amount of operations.

Note that the wireless communication system 1 may further include another allocation determination device having a configuration similar to that of the first allocation determination device 5 or the second allocation determination device 6. The other allocation determination device determines communication resources to be allocated to each of one or more terminal devices 4 that belong to a third group and to which communication resources are to be allocated at a certain time point. The terminal devices 4 belonging to the third group are, for example, terminal devices 4 of mMTC.

Note that, in the following, a case where each of the plurality of terminal devices 4 is either a terminal device of URLLC or a terminal device of eMBB, and the wireless communication system 1 includes the first allocation determination device 5 and the second allocation determination device 6 will be mainly exemplified. In this case, the first group is a URLLC group, and the second group is an eMBB group.

Here, an internal configuration of the base station 3 will be described.

The base station 3 includes a communication device 31 and a control device 32.

The communication device 31 is a device capable of communicating with the outside of the base station 3. The communication device 31 is capable of communicating with each of the plurality of terminal devices 4, for example. Furthermore, the communication device 31 is capable of communicating with the core network 2. The communication device 31 includes a circuit for transmitting a signal to the outside and receiving a signal from the outside. The signals are, for example, modulated signals of the 5G system. The circuit includes, for example, a modulation circuit, a demodulation circuit, and an antenna.

The control device 32 is, for example, an information processing device. The control device 32 controls wireless communication between each of the plurality of terminal devices 4 and the communication device 31. More specifically, the control device 32 executes allocation control processing for controlling allocation of communication resources to be used for wireless communication. The allocation control processing is processing of selecting one or more terminal devices 4 to which communication resources are to be allocated at a certain time point from the plurality of terminal devices 4 and allocating the communication resources to each of the selected one or more terminal devices 4. Hereinafter, the selected terminal devices 4 will be also referred to as target devices 4.

More specifically, the control device 32 selects one or more terminal devices 4 (one or more target devices 4) to which communication resources are to be allocated at a certain time point from the plurality of terminal devices 4. The control device 32 classifies the one or more target devices 4 into a first group and a second group. The control device 32 requests the first allocation determination device 5 to determine communication resources to be allocated to each target device 4 belonging to the first group (first allocation request). The control device 32 receives first allocation information generated in accordance with the first allocation request, from the first allocation determination device 5. After receiving the first allocation information, the control device 32 requests the second allocation determination device 6 to determine communication resources to be allocated to each target device 4 belonging to the second group (second allocation request). The control device 32 receives second allocation information generated in accordance with the second allocation request, from the second allocation determination device 6.

Then, the control device 32 executes allocation processing based on the first allocation information and the second allocation information. Specifically, the control device 32 allocates communication resources that are indicated by the first allocation information, to each target device 4 belonging to the first group. The control device 32 allocates communication resources that are indicated by the second allocation information, to each target device 4 belonging to the second group. Each target device 4 is notified of information indicative of the allocated communication resources via the communication device 31.

Each target device 4 can perform data transfer with the communication device 31 by using the allocated communication resources. The data transfer may include data transfer from the target device 4 to the communication device 31 (the base station 3) and data transfer from the communication device 31 to the target device 4.

In this manner, the control device 32 can control allocation of communication resources to be used for wireless communication between each of the plurality of terminal devices 4 and the communication device 31.

Next, a hardware configuration of the control device 32 will be described.

FIG. 2 is a block diagram illustrating an example of a hardware configuration of the control device 32. The control device 32 includes, for example, a CPU 71, a random access memory (RAM) 72, a BIOS-ROM 73, a nonvolatile memory 74, a communication interface (communication I/F) 75, and a timer 76. The CPU 71, the RAM 72, the BIOS-ROM 73, the nonvolatile memory 74, the communication I/F 75, and the timer 76 are connected via, for example, a bus 70.

The CPU 71 is, for example, at least one processor. The CPU 71 controls operation of various components of the control device 32. The CPU 71 executes various programs loaded from the nonvolatile memory 74, which is a storage device, to the RAM 72. These programs include, for example, an operating system (OS), a driver, and various application programs.

The CPU 101 also executes a basic input/output system (BIOS) stored in the BIOS-ROM 73. The BIOS is a program for hardware control.

The RAM 72 is a volatile memory. The RAM 72 is implemented, for example, as a dynamic random access memory (DRAM) or a static random access memory (SRAM). A storage area of the RAM 72 is allocated as, for example, a storage area of the programs.

The communication I/F 75 functions as a control circuit that controls communication between the control device 32 and the outside. The communication I/F 75 includes a transmission unit that transmits a signal and a receiving unit that receives a signal.

The timer 76 measures time. The timer 76 may provide the measured time to each component of the control device 32.

Note that each of the first allocation determination device 5 and the second allocation determination device 6 has, for example, a hardware configuration similar to that of the control device 32. Alternatively, the control device 32 may further have functions of the first allocation determination device 5 and functions of the second allocation determination device 6.

The function of the control device 32 may be implemented by dedicated hardware in the control device 32 or may be implemented by the CPU 71 executing programs.

Figure 3:
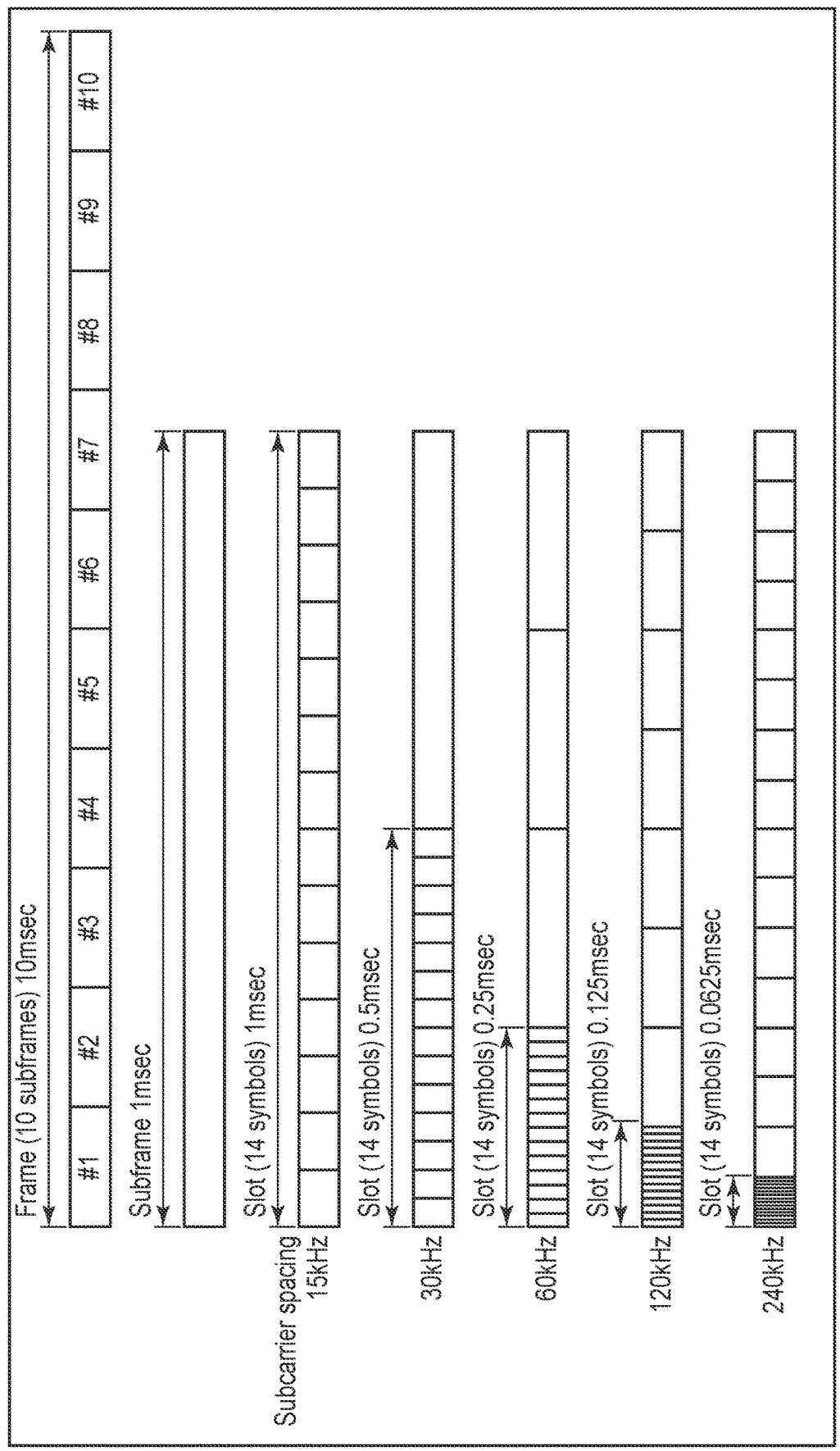
FIG. 3 is a view illustrating an example of a frame configuration of a modulated signal that is used in the wireless communication system according to the embodiment.

Next, a frame configuration of a modulated signal of the 5G system will be described. FIG. 3 is a view illustrating an example of the frame configuration of the modulated signal.

In the 5G system, the time length of a frame is determined in advance. The frame is a data signal having a length that corresponds to the predetermined time length. The time length of the frame corresponds to, for example, an operation cycle of encoding/decoding regarding the modulated signal. The time length of one frame is 10 milliseconds (msec). One frame includes ten subframes.

The time length of a subframe is determined in advance in the 5G system. The time length of one subframe is one millisecond. One subframe includes one or more slots.

A slot is a unit of scheduling data transfer. The slot is composed of, for example, 14 OFDM symbols regardless of a subcarrier spacing. The time length of an OFDM symbol depends on the subcarrier spacing. Thus, the time length of a slot (slot length) varies depending on the subcarrier spacing. The subcarrier spacing is determined, for example, by the base station 3 (more specifically, the control device 32). Thus, the time length of an OFDM symbol and the slot length are determined by the base station 3.

The 5G system defines five types of subcarrier spacings. The five types of subcarrier spacings are 15 kHz ($\mu=0$), 30 kHz ($\mu=1$), 60 kHz ($\mu=2$), 120 kHz ($\mu=3$), and 240 kHz ($\mu=4$). Note that $\mu$ is a value for identifying one of the subcarrier spacings.

As illustrated in FIG. 3, in a case where the subcarrier spacing is 15 kHz, one subframe includes one slot. In a case where the subcarrier spacing is 30 kHz, one subframe includes two slots. In a case where the subcarrier spacing is 60 kHz, one subframe includes four slots. In a case where the subcarrier spacing is 120 kHz, one subframe includes eight slots. In a case where the subcarrier spacing is 240 kHz, one subframe includes 16 slots.

The smaller the subcarrier spacing, the longer the slot length. In other words, the larger the subcarrier spacing, the shorter the slot length. Specifically, for example, in a case where the subcarrier spacing is 15 kHz, the slot length is one millisecond. In a case where the subcarrier spacing is 30 kHz, the slot length is 0.5 milliseconds. In a case where the subcarrier spacing is 60 kHz, the slot length is 0.25 milliseconds. In a case where the subcarrier spacing is 120 kHz, the slot length is 0.125 milliseconds. In a case where the subcarrier spacing is 240 kHz, the slot length is 0.0625 milliseconds.

In a case where the subcarrier spacing is small and the slot length is long (for example, in a case where the subcarrier spacing is 15 kHz and the slot length is one millisecond), it is strong against multipath, but the latency is long. On the other hand, in a case where the subcarrier spacing is large and the slot length is short (for example, in a case where the subcarrier spacing is 240 kHz and the slot length is 0.0625 milliseconds), the latency is short, but susceptibility to inter symbol interference (ISI) is increased.

Thus, for example, the terminal device 4 that moves at low speed and performs data transfer with a long tolerable latency is preferably allocated to a communication block with a small subcarrier spacing. Furthermore, for example, the terminal device 4 that moves at high speed and performs data transmission with a short tolerable latency is preferably allocated to a communication block with a large subcarrier spacing.

The communication block is a unit of communication resources identified by a position in a frequency direction and a position in a time direction in the modulated signal. The modulated signal includes a plurality of communication blocks. Each of the communication blocks is, for example, a resource element, a resource block, or a resource block group.

Figure 4:
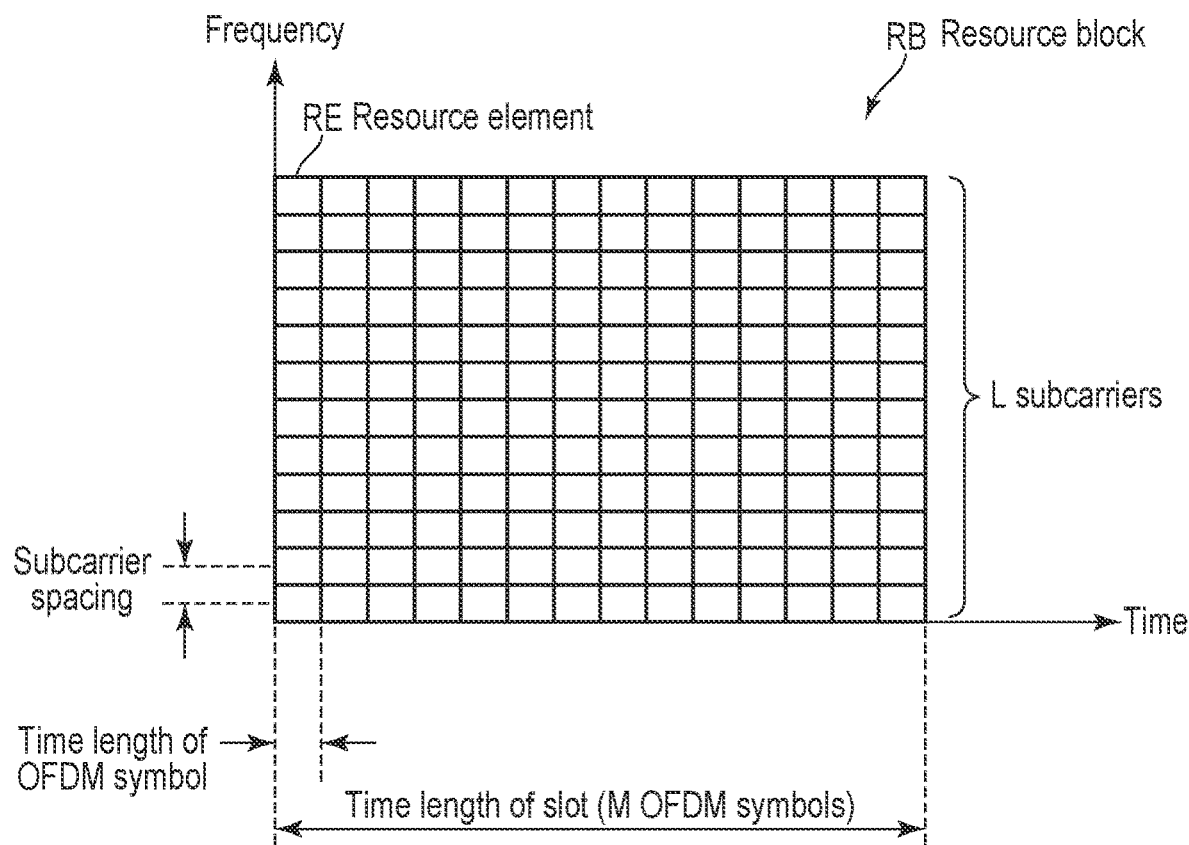
FIG. 4 is a view illustrating an example of a relationship between a subcarrier spacing, a slot, resource elements, and a resource block that are used in the wireless communication system according to the embodiment.

The communication block allocated to the terminal device 4 will be described. FIG. 4 is a view illustrating an example of a relationship between a subcarrier spacing, a slot, resource elements, and a resource block. Each of FIGS. 4 to 7 indicates a frequency on a vertical axis and indicates time on a horizontal axis.

The 5G system defines a unit including M OFDM symbols as a slot. M is, for example, 14.

In the 5G system, a resource element RE is a unit that includes one subcarrier and one OFDM symbol. One resource element RE is identified by a subcarrier position indicating a position in a frequency direction and a symbol position indicating a position in a time direction, in the modulated signal.

A resource block RB is a unit that includes L subcarriers and one slot. L is, for example, 12. One resource block RB includes a plurality of resource elements RE. For example, in a case where the resource block includes 12 subcarriers and one slot (that is, 14 OFDM symbols), the resource block RB includes 168 (=12×14) resource elements RE. Note that the subcarrier spacing is changeable for each resource block RB.

A resource block group is a unit in which a plurality of resource blocks RB are grouped. For example, in a case where a band of 100 MHz width is used as the modulated signal of the 5G system, one subframe includes 17 resource block groups.

The resource blocks are further described with reference to FIGS. 5 to 7. In the examples illustrated in FIGS. 5 to 7, it is assumed that one subframe includes 16 resource blocks RB. In this case, the 16 resource blocks RB include, for example, one slot (14 OFDM symbols) and 192 (=12×16) subcarriers.

Figure 5:
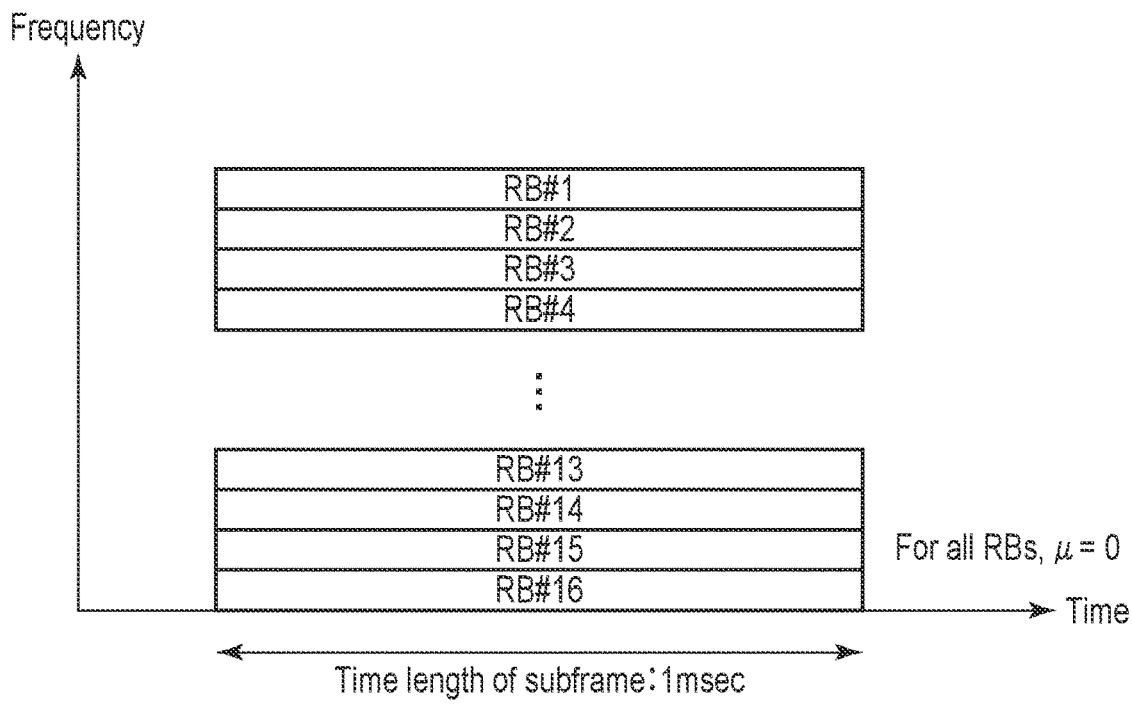
FIG. 5 is a view illustrating a first arrangement example of resource blocks that are used in the wireless communication system according to the embodiment.

FIG. 5 is a view illustrating a first arrangement example of the resource blocks in a time-frequency domain corresponding to a modulated signal of the 5G system. In the example illustrated in FIG. 5, the whole region of a band is allocated to the subcarrier spacing of 15 kHz ($\mu=0$) that is the largest. The 16 resource blocks RB #1 to RB #16 correspond to the same slot. In other words, positions in the time direction of the 16 resource blocks RB #1 to RB #16 are the same. Further, the 16 resource blocks RB #1 to RB #16 correspond to 16 consecutive frequency bands, respectively.

In other words, the 16 resource blocks RB #1 to RB #16 are arranged adjacent to each other in the frequency direction. The terminal device 4 to which such resource blocks RB #1 to RB #16 are allocated can perform data transfer that has a long tolerable latency and is resistant to multipath.

Figure 6:
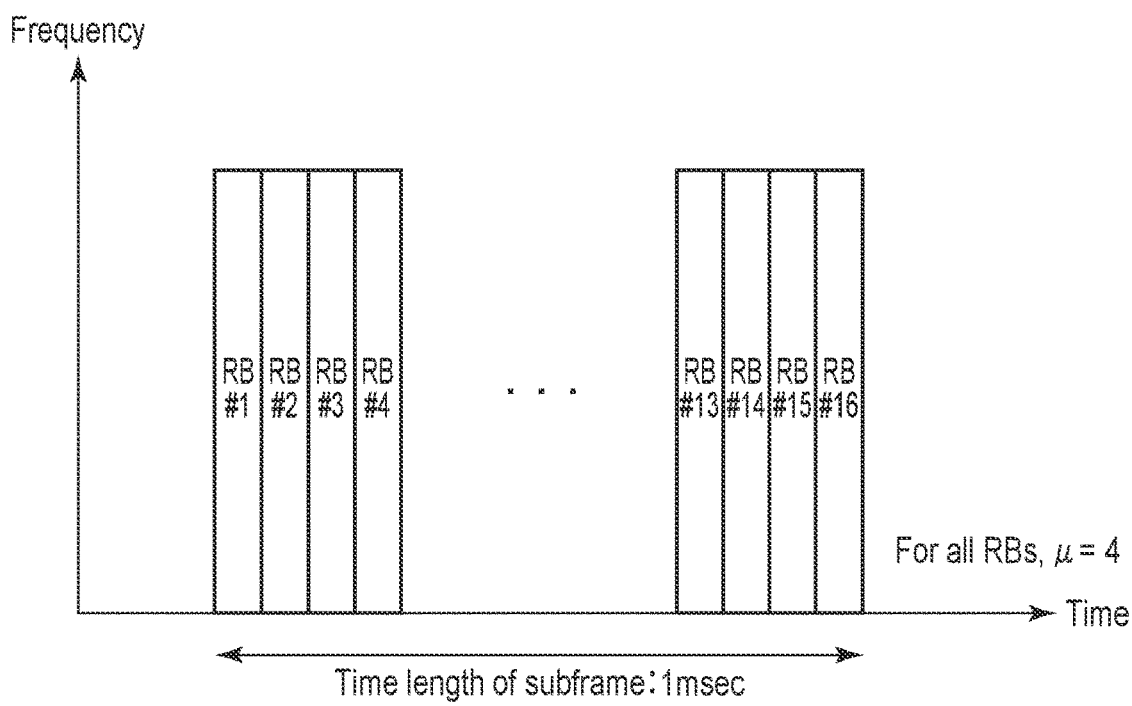
FIG. 6 is a view illustrating a second arrangement example of the resource blocks that are used in the wireless communication system according to the embodiment.

FIG. 6 is a view illustrating a second arrangement example of the resource blocks in a time-frequency domain corresponding to a modulated signal of the 5G system. In the example illustrated in FIG. 6, the whole region of a band is allocated to the subcarrier spacing of 240 kHz ($\mu$=4) that is the smallest. The 16 resource blocks RB #1 to RB #16 correspond to 16 consecutive slots, respectively. In other words, the 16 resource blocks RB #1 to RB #16 are arranged adjacent to each other in the time direction. Further, the 16 resource blocks RB #1 to RB #16 correspond to the same frequency band. In other words, positions in the frequency direction of the 16 resource blocks RB #1 to RB #16 are the same. The terminal device 4 to which such resource blocks RB #1 to RB #16 are allocated can perform data transfer with a short tolerable latency.

Figure 7:
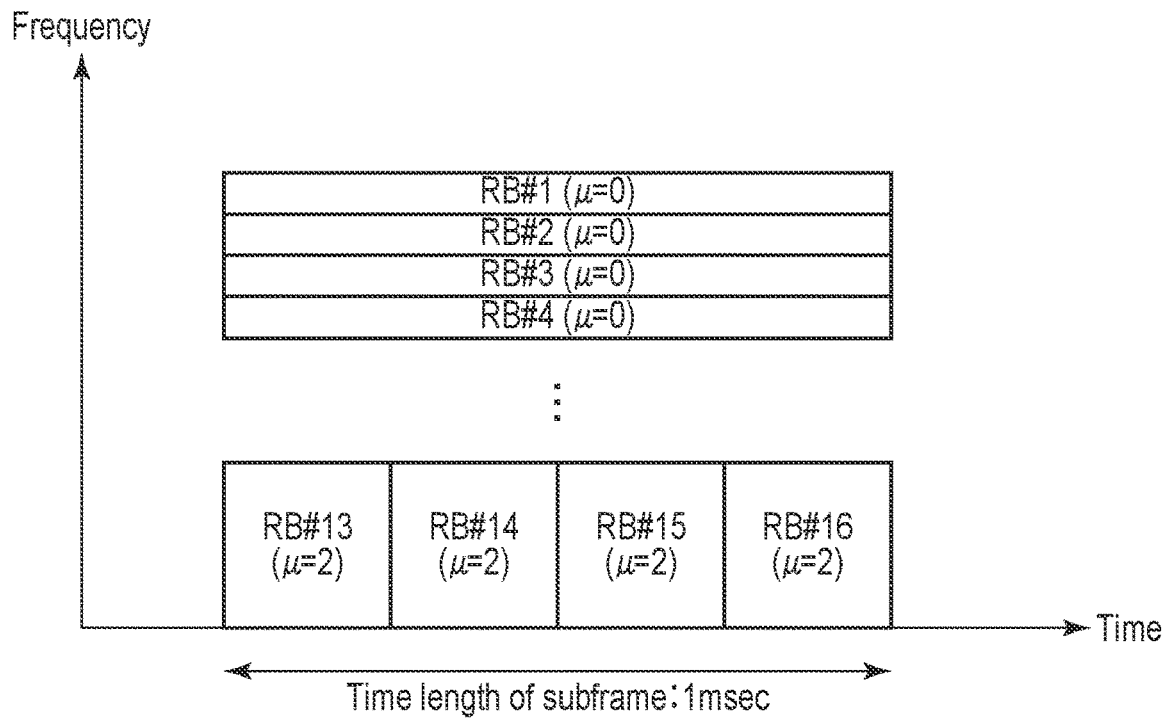
FIG. 7 is a view illustrating a third arrangement example of the resource blocks that are used in the wireless communication system according to the embodiment.

FIG. 7 is a view illustrating a third arrangement example of the resource blocks in a time-frequency domain corresponding to a modulated signal of the 5G system. In the example illustrated in FIG. 7, a band is divided into two regions, one region is allocated to the largest subcarrier spacing of 15 kHz ($\mu$=0), and the other region is allocated to the subcarrier spacing of 60 kHz ($\mu$=2).

For example, the resource blocks RB #1 to RB #4 are resource blocks with the subcarrier spacing of 15 kHz. The resource blocks RB #1 to RB #4 correspond to the same slot. The resource blocks RB #1 to #4 respectively correspond to consecutive four frequency bands.

Furthermore, for example, the resource blocks RB #13 to RB #16 are resource blocks with the subcarrier spacing of 60 kHz. The resource blocks RB #13 to #16 respectively correspond to consecutive four slots. Further, the resource blocks RB #13 to #16 correspond to the same frequency band.

In a case where such resource blocks RB #1 to RB #16 are used, for example, at least one of the resource blocks RB #1 to RB #4 is allocated to the terminal device 4 that requires data transfer that has a long tolerable latency and high reliability. In addition, at least one of the resource blocks RB #13 to RB #16 is allocated to the terminal device 4 that requires data transfer that has a short tolerable latency and tolerates low reliability. Thus, data transfer with multiple terminal devices 4 having different requirements can be performed in one subframe.

In this manner, the band of the modulated signal may be divided into multiple regions, and different subcarrier spacings may be allocated to each of the regions. As a result, a resource block having an appropriate subcarrier spacing according to a requirement is allocated to each terminal device 4. Thus, resource blocks can be allocated such that different requirements of the terminal devices 4 are satisfied.

Figure 8:
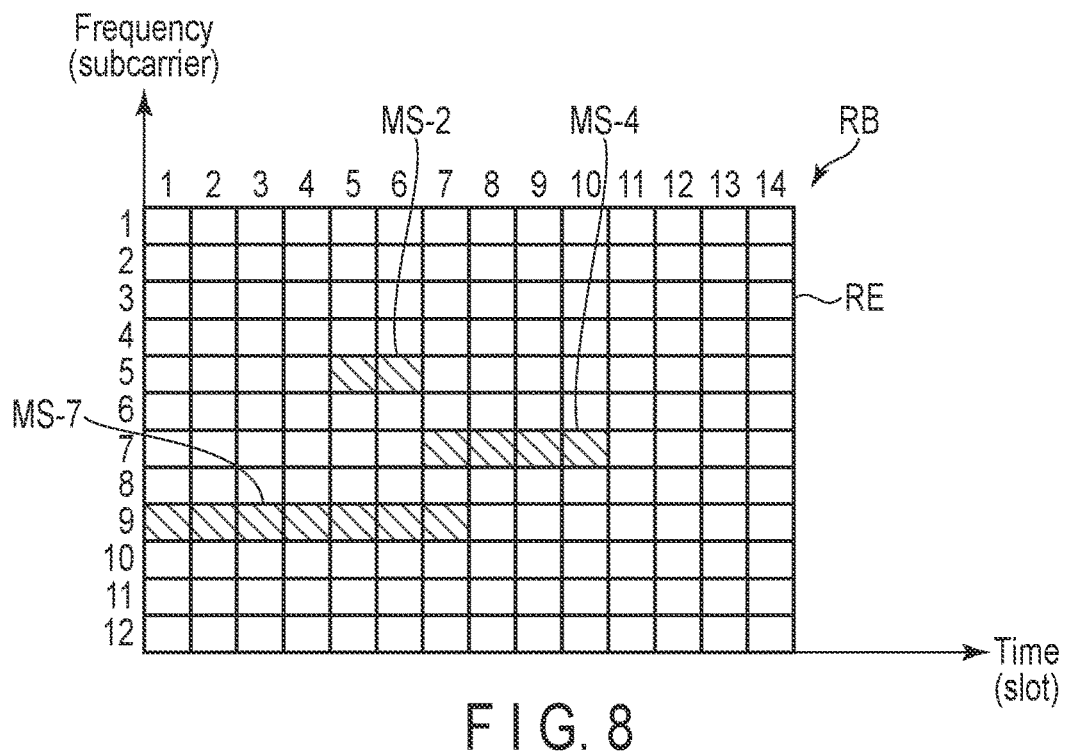
FIG. 8 is a view illustrating an example of allocation of resource blocks that are used in the wireless communication system according to the embodiment, with mini-slots.

FIG. 8 is a view illustrating an example of allocation of resource blocks with mini-slots.

In the 5G system, a unit constituted by consecutive $\eta$ OFDM symbols and one subcarrier is defined as a mini-slot. For example, $\eta$ is 2, 4, or 7. Alternatively, $\eta$ may be any integer from 2 to 13.

In the example illustrated in FIG. 8, a mini-slot MS-2 is a mini-slot having $\eta$ of 2. A mini-slot MS-4 is a mini-slot having $\eta$ of 4. A mini-slot MS-7 is a mini-slot having $\eta$ of 7.

The communication block may be a mini-slot. In other words, consecutive $\eta$ resource elements corresponding to one subcarrier in the resource block may be allocated to a terminal device 4.

For example, in a case where a terminal device 4 requires data transfer with a ultra-low latency, the subcarrier spacing of a resource block including a mini-slot allocated to the terminal device 4 is set to the largest 240 kHz ($\mu$=4). As a result, the terminal device 4 can perform data transfer with a ultra-low latency.

Figure 9:
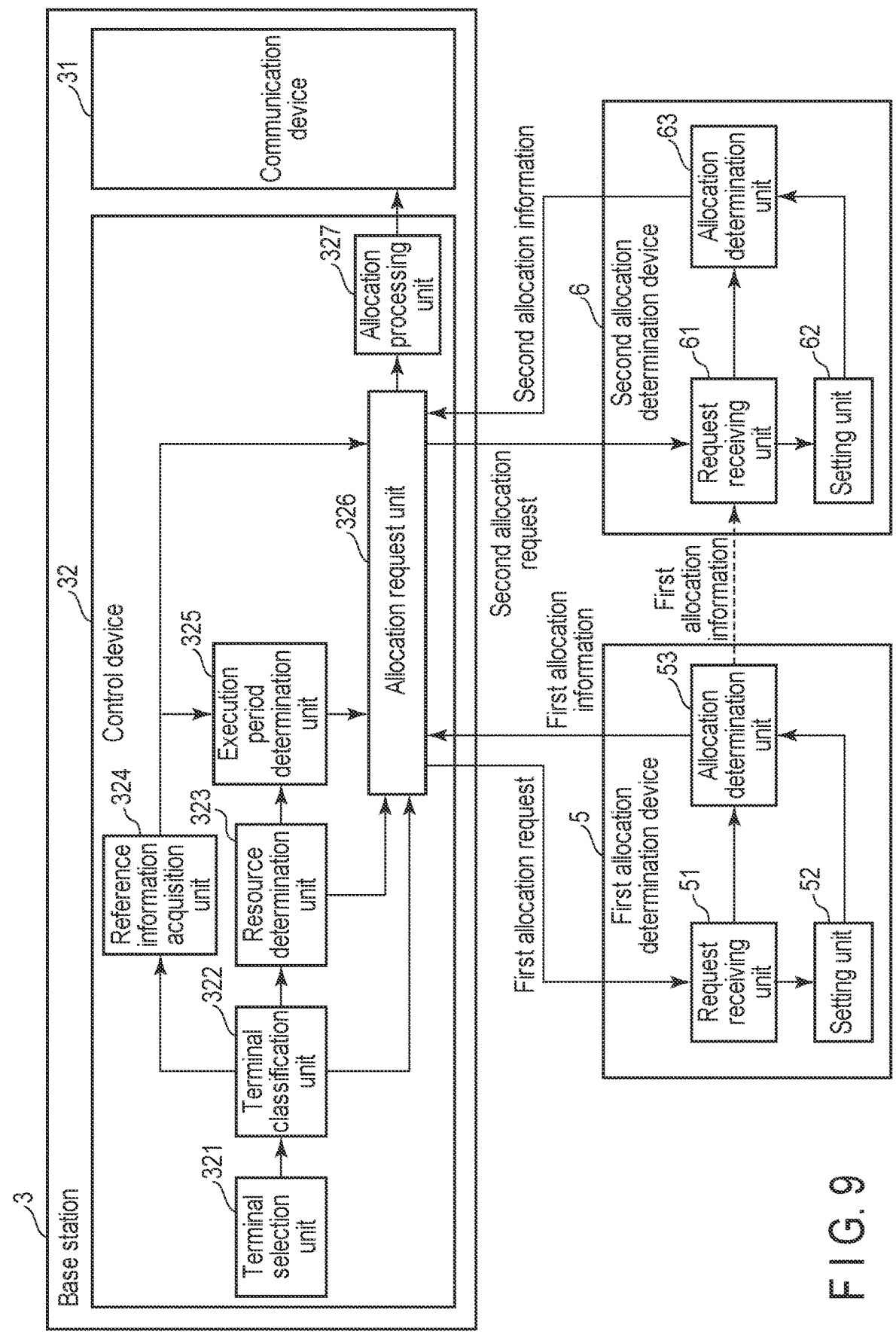
FIG. 9 is a block diagram illustrating a configuration example of the control device, a first allocation determination device, and a second allocation determination device in the wireless communication system according to the embodiment.

FIG. 9 is a block diagram illustrating a configuration example of the control device 32 of the base station 3, the first allocation determination device 5, and the second allocation determination device 6. Respective configurations of the control device 32, the first allocation determination device 5, and the second allocation determination device 6 will be described below.

Control Device 32

The control device 32 includes, for example, a terminal selection unit 321, a terminal classification unit 322, a resource determination unit 323, a reference information acquisition unit 324, an execution period determination unit 325, an allocation request unit 326, and an allocation processing unit 327. The terminal selection unit 321, the terminal classification unit 322, the resource determination unit 323, the reference information acquisition unit 324, the execution period determination unit 325, the allocation request unit 326, and the allocation processing unit 327 execute allocation control processing. The allocation control processing is processing of acquiring the first allocation information and the second allocation information and allocating communication blocks to the terminal devices 4 within a period from a first time point to a second time point. The first time point and the second time point are time points determined in advance by scheduling.

In a case where the current time point is the first time point, the terminal selection unit 321 selects one or more terminal devices 4 (one or more target devices 4) to which communication resources are to be allocated at the second time point, from the plurality of terminal devices 4. Each of the one or more target devices 4 is, for example, a terminal device scheduled to perform data transfer with the base station 3 after the second time point.

The one or more target devices 4 may be all or some of the plurality of terminal devices 4. Note that, for example, in a case where the maximum number of terminal devices 4 to which communication resources are to be allocated at a time is determined, the terminal selection unit 321 selects terminal devices 4 whose number is equal to or less than the maximum number.

Furthermore, for example, in a case where downlink data is accumulated in the communication device 31 at the first time point, the terminal selection unit 321 may preferentially select the terminal device 4 that will receive the downlink data. The downlink data is data to be transferred from the communication device 31 to the terminal device 4.

Further, in a case where a reservation request for allocation of communication resources is accumulated in the communication device 31 at the first time point, the terminal selection unit 321 may preferentially select the terminal device 4 that is a target of the reservation request.

In addition, in a case where downlink data whose tolerable latency is equal to or less than a predetermined period is accumulated in the communication device 31 at the first time point, the terminal selection unit 321 may preferentially select a terminal device 4 that will receive the downlink data whose tolerable latency is equal to or less than the predetermined period, as the target device. Furthermore, in a case where a reservation request for allocation of transmission and receiving of data whose tolerable latency is equal to or less than the predetermined period is accumulated in the communication device 31 at the first time point, the terminal selection unit 321 may preferentially select the terminal device 4 that will transmit and/or receive the data whose tolerable latency is equal to or less than the predetermined period and which is a reservation target, as the target device.

The terminal selection unit 321 sends information indicative of the selected one or more target devices 4 to the terminal classification unit 322.

The terminal classification unit 322 classifies the selected one or more target devices 4 into a first group and a second group by using the information sent from the terminal selection unit 321. Here, it is assumed that the first group is a URLLC group and the second group is an eMBB group. The terminal classification unit 322 sends information indicative of the classified target devices 4 (hereinafter, also referred to as target device information) to the resource determination unit 323, the reference information acquisition unit 324, and the allocation request unit 326.

The resource determination unit 323 determines communication blocks of an allocation range in the modulated signal. The communication blocks of the allocation range are, for example, a plurality of communication blocks after the second time point. More specifically, the communication blocks of the allocation range include a plurality of subcarriers and a plurality of OFDM symbols after the second time point. The resource determination unit 323 may determine the communication blocks of the allocation range according to the number of the one or more target devices 4 based on the target device information. Furthermore, in a case where the one or more target devices 4 include a terminal device 4 that requires data transfer whose tolerable latency is less than the threshold, the resource determination unit 323 may set the allocation range to a range that includes a first number of OFDM symbols immediately after the second time point. On the other hand, in a case where the one or more target devices 4 do not include a terminal device 4 that requires data transfer whose tolerable latency is less than the threshold, the resource determination unit 323 may set the allocation range to a range that includes a second number of OFDM symbols larger than the first number. As a result, in a case where there is a terminal device 4 requiring data transfer whose tolerable latency is less than the threshold, the resource determination unit 323 can determine the allocation range so that the data transfer is performed at an earlier time. The resource determination unit 323 sends information indicative of the communication blocks of the allocation range (hereinafter, also referred to as allocation range information) to the execution period determination unit 325 and the allocation request unit 326. The allocation range information is, for example, information that uniquely identifies a position in the frequency direction and a position in the time direction of each of the plurality of communication blocks within the allocation range.

The reference information acquisition unit 324 acquires information regarding the first group (first reference information) and information regarding the second group (second reference information) by using the target device information. The first reference information includes reference information corresponding to each of one or more target devices 4 that belong to the first group. The second reference information includes reference information corresponding to each of one or more target devices 4 that belong to the second group.

The reference information corresponding to a certain target device 4 includes, for example, information indicating tolerable latency, communication quality, and an amount of data in data transfer by the target device 4.

The tolerable latency is a period of latency tolerable in the data transfer.

The communication quality is, for example, communication quality in past data transfer by the target device 4. The communication quality is represented by, for example, at least one of a channel quality indicator (CQI), a modulation and coding scheme (MCS), transmission power, or an error rate. The CQI is an index value indicating receiving quality of the target device 4. The MCS is information including an orthogonal modulation scheme and a coding rate. The CQI, the MCS, the transmission power, and the error rate may be past statistical values (for example, average values) or values in a previous period of time.

The data amount includes, for example, at least one of an amount of data to be transmitted, an amount of data per unit time transmitted and received in the past, an occurrence frequency of data transmitted and received in the past, occurrence tendency of data transmitted and received in the past, a predicted occurrence frequency of future data, and predicted occurrence tendency of future data with respect to the target device 4.

The reference information may further include a propagation channel matrix of the corresponding target device 4 in the past.

The reference information acquisition unit 324 may acquire reference information that is collected and stored in the nonvolatile memory 74, etc., while data transfer is performed between the communication device 31 and each of the plurality of terminal devices 4, as the first reference information and the second reference information. The reference information acquisition unit 324 sends the acquired first reference information and second reference information to the execution period determination unit 325 and the allocation request unit 326.

The execution period determination unit 325 determines a first execution period that is an upper limit of an execution period of first allocation determination processing and a second execution period that is an upper limit of an execution period of second allocation determination processing. The first allocation determination processing is processing in which the first allocation determination device 5 determines communication blocks to be allocated to each target device 4 belonging to the first group and generates first allocation information. The second allocation determination processing is processing in which the second allocation determination device 6 determines communication blocks to be allocated to each target device 4 belonging to the second group and generates second allocation information. A sum of the first execution period and the second execution period corresponds to, for example, a period from the first time point to the second time point. The execution period determination unit 325 determines the first execution period and the second execution period based on the number of target devices 4 for each group, the amount of data to be transferred, the channel state, and the like by using, for example, the first reference information, the second reference information, and the allocation range information. Specifically, the execution period determination unit 325 determines the first execution period and the second execution period on the basis of the number of the target devices 4 belonging to the first group and the number of the target devices 4 belonging to the second group. For example, in a case where the number of the target devices 4 belonging to the first group is equal to or larger than a threshold, the execution period determination unit 325 lengthens the first execution period and shortens the second execution period.

The execution period determination unit 325 sends the determined first execution period and second execution period to the allocation request unit 326.

The allocation request unit 326 transmits a first allocation request to the first allocation determination device 5. The first allocation request includes, for example, the target device information, the allocation range information, the first reference information, and the first execution period. Then, the allocation request unit 326 receives first allocation information generated in accordance with the first allocation request, from the first allocation determination device 5. For example, the first allocation information is received within the first execution period after the first allocation request is transmitted.

In response to receiving of the first allocation information, the allocation request unit 326 transmits a second allocation request to the second allocation determination device 6. The second allocation request includes, for example, the target device information, the allocation range information, the second reference information, the second execution period, and the first allocation information. In a case where the first allocation information is transmitted from the first allocation determination device 5 to the second allocation determination device 6, the second allocation request may not include the first allocation information. Then, the allocation request unit 326 receives second allocation information generated in accordance with the second allocation request, from the second allocation determination device 6. The second allocation information is received, for example, within the second execution period after the second allocation request is transmitted. Thus, the allocation request unit 326 can acquire the first allocation information and the second allocation information from the first time point to the second time point. The allocation request unit 326 sends the first allocation information and the second allocation information to the allocation processing unit 327.

The allocation processing unit 327 performs allocation processing using the first allocation information and the second allocation information. Specifically, the allocation processing unit 327 allocates one or more communication blocks to each of the one or more target devices 4 belonging to the first group on the basis of the first allocation information. The allocation processing unit 327 allocates one or more communication blocks to each of the one or more target devices 4 belonging to the second group on the basis of the second allocation information. The communication device 31 is notified of information on the communication blocks allocated to each target device 4, and the information is transmitted to the corresponding target device 4. Each target device 4 performs data transfer with the communication device 31 (the base station 3) by using a modulated signal corresponding to the allocated communication blocks.

Note that, in the allocation processing, the allocation processing unit 327 may set at least one of a subcarrier spacing, an orthogonal modulation scheme, a transmission power, a coding rate, or a propagation channel matrix to be used in the massive MIMO scheme. The subcarrier spacing is set, for example, for each of resource blocks included in a modulated signal. The orthogonal modulation scheme, the transmission power, and the coding rate are set for data included in each communication block, for example. The propagation channel matrix is set for each of the one or more target devices 4, for example.

With the above configuration, the control device 32 can acquire the first allocation information and the second allocation information from the first time point to the second time point that are determined by scheduling. Accordingly, the control device 32 can allocate communication blocks to the one or more target devices 4 belonging to the first group and the one or more target devices 4 belonging to the second group without latency.

Note that, in a case where since the mixed-numerology is employed, resource blocks having different subcarrier spacings may be included in the modulated signal, the terminal selection unit 321 selects one or more terminal devices 4 (one or more target devices 4) that use the same subcarrier spacing and to which communication resources are to be allocated at the second time point, from the plurality of terminal devices 4. In this case, allocation of communication blocks is determined for the one or more target devices 4 using the same subcarrier spacing. In addition, allocation of communication blocks to target devices 4 that use a certain subcarrier spacing and allocation of communication blocks to target devices 4 that use another subcarrier spacing may be determined in parallel or sequentially. Time points at which these two kinds of allocation are determined may be synchronized or not synchronized. For example, a determination cycle of allocation of communication blocks to target devices 4 that use a smaller subcarrier spacing may be made shorter.

First Allocation Determination Device 5

The first allocation determination device 5 includes, for example, a request receiving unit 51, a setting unit 52, and an allocation determination unit 53.

The request receiving unit 51 receives the first allocation request from the control device 32 of the base station 3. The first allocation request includes, for example, the target device information, the allocation range information, the first reference information, and the first execution period. The request receiving unit 51 sends, for example, the first execution period to the setting unit 52. In addition, the request receiving unit 51 sends, for example, the target device information, the allocation range information, and the first reference information to the allocation determination unit 53.

The setting unit 52 determines an algorithm (first algorithm) for determining allocation of communication blocks, based on the first execution period. The determined first algorithm is an algorithm that enables the allocation determination unit 53 to determine communication blocks to be allocated to each of the one or more target devices 4 belonging to the first group within the first execution period.

Specifically, for example, in a case where the first execution period is shorter than a first threshold value, the setting unit 52 selects an algorithm with a small calculation amount. In addition, for example, in a case where the first execution period is equal to or longer than the first threshold value, the setting unit 52 selects an algorithm having a large calculation amount. The algorithm with a small calculation amount is, for example, an algorithm with a narrow search range for an optimal solution. The algorithm with a large calculation amount is, for example, an algorithm with a wide search range, such as an algorithm for exhaustively searching all combinations for an optimum solution.

The setting unit 52 sets the allocation determination unit 53 so as to operate according to the determined first algorithm. Alternatively, the setting unit 52 may notify the allocation determination unit 53 of the first algorithm.

In addition, the setting unit 52 may determine a scheduling policy (first scheduling policy) for determining allocation of communication blocks on the basis of the first execution period. The scheduling policy is different for each group of the terminal devices 4, for example. The first scheduling policy is, for example, not allocating communication blocks corresponding to a predetermined number of OFDM symbols from an end among M (for example, 14) OFDM symbols constituting the allocation range, allocating communication blocks whose positions in the time direction are as early as possible (i.e., setting a limit of a latest communication block to be allocated), minimizing an average latency of the one or more target devices 4, or the like.

Furthermore, for example, the setting unit 52 may select one machine learning model from multiple machine learning models that may be used by the allocation determination unit 53, based on the first execution period. Operation periods of the machine learning models are different from each other. The selected one machine learning model is a machine learning model that enables the allocation determination unit 53 to determine communication blocks to be allocated to each of the one or more target devices 4 belonging to the first group within the first execution period. In this case, the setting unit 52 sets the allocation determination unit 53 so as to operate using the selected machine learning model. Alternatively, the setting unit 52 may notify the allocation determination unit 53 of the selected machine learning model.

Alternatively, the setting unit 52 may set one or more parameters regarding an operation period for a solver that calculates a solution of a quadratic unconstrained binary optimization (QUBO) problem to be used by the allocation determination unit 53. The set parameters are parameters that enable the allocation determination unit 53 to determine communication blocks to be allocated to each of the one or more target devices 4 belonging to the first group within the first execution period.

The allocation determination unit 53 determines communication blocks to be allocated to each of the one or more target devices 4 belonging to the first group, based on the first scheduling policy, the target device information, the allocation range information, and the first reference information. The one or more target devices 4 belonging to the first group are identified by the target device information. More specifically, the allocation determination unit 53 executes processing of determining, based on the first reference information, which of the plurality of communication blocks within the allocation range are to be allocated to which of the one or more target devices 4 belonging to the first group according to the first scheduling policy. Note that this processing is processing to which the first algorithm is applied, for example. The plurality of communication blocks within the allocation range are identified by the allocation range information. The allocation determination unit 53 determines, based on the first reference information, which of the plurality of communication blocks within the allocation range are to be allocated to the one or more target devices 4 belonging to the first group by using, for example, the exhaustive search, the machine learning model, or the solver that calculates a solution of the QUBO problem.

For example, in a case where the solver that calculates a solution of the QUBO problem is used, the allocation determination unit 53 generates an objective function of the QUBO problem based on the target device information, the allocation range information, and the first reference information. The allocation determination unit 53 inputs the generated objective function to the QUBO solver, thereby obtaining a solution that minimizes the objective function. The obtained solution indicates the determined allocation of communication blocks.

The allocation determination unit 53 generates allocation information (first allocation information) indicative of the determined allocation of communication blocks. The first allocation information may include information that indicates at least one of the orthogonal modulation scheme, the transmission power, the coding rate, or the propagation channel matrix to be used in the massive MIMO scheme. The orthogonal modulation scheme, the transmission power, and the coding rate are set for data included in each communication block, for example. The propagation channel matrix is set for each of the one or more target devices 4, for example. The allocation determination unit 53 notifies the control device 32 of the generated first allocation information.

With the above configuration, the first allocation determination device 5 can provide the first allocation information to the control device 32 within the first execution period in response to receiving of the first allocation request from the control device 32.

Second Allocation Determination Device 6

The second allocation determination device 6 includes, for example, a request receiving unit 61, a setting unit 62, and an allocation determination unit 63.

The request receiving unit 61 receives the second allocation request from the control device 32 of the base station 3. The second allocation request includes, for example, the target device information, the allocation range information, the second reference information, the second execution period, and the first allocation information. Note that the first allocation information does not have to be included in the second allocation request. In this case, the request receiving unit 61 receives the first allocation information from the first allocation determination device 5. The request receiving unit 61 sends, for example, the second execution period to the setting unit 62. In addition, the request receiving unit 61 sends, for example, the target device information, the allocation range information, the second reference information, and the first allocation information to the allocation determination unit 63.

The setting unit 62 determines an algorithm (second algorithm) for determining allocation of communication blocks, based on the second execution period. The determined second algorithm is an algorithm that enables the allocation determination unit 63 to determine communication blocks to be allocated to each of the one or more target devices 4 belonging to the second group within the second execution period.

Specifically, for example, in a case where the second execution period is shorter than a second threshold value, the setting unit 62 selects an algorithm with a small calculation amount. In addition, for example, in a case where the second execution period is equal to or longer than the second threshold value, the setting unit 62 selects an algorithm with a large calculation amount.

The setting unit 62 sets the allocation determination unit 63 so as to operate according to the determined second algorithm. Alternatively, the setting unit 62 may notify the allocation determination unit 63 of the second algorithm.

In addition, the setting unit 62 may determine a scheduling policy (second scheduling policy) for determining allocation of communication blocks, based on the second execution period. The second scheduling policy is different from the first scheduling policy. The second scheduling policy is, for example, round robin, max throughput, proportional fairness, or the like.

Furthermore, for example, the setting unit 62 may select one machine learning model from multiple machine learning models that may be used by the allocation determination unit 63, based on the second execution period. Operation periods of the machine learning models are different from each other. The selected one machine learning model is a machine learning model that enables the allocation determination unit 63 to determine communication blocks to be allocated to each of the one or more target devices 4 belonging to the second group within the second execution period. In this case, the setting unit 62 sets the allocation determination unit 63 so as to operate using the selected machine learning model. Alternatively, the setting unit 62 may notify the allocation determination unit 63 of the selected machine learning model.

Alternatively, the setting unit 62 may set one or more parameters related to an operation period to a solver that calculates a solution of a QUBO problem to be used by the allocation determination unit 63. The set parameters are parameters that enable the allocation determination unit 63 to determine communication blocks to be allocated to each of the one or more target devices 4 belonging to the second group within the second execution period.

The allocation determination unit 63 determines communication blocks to be allocated to each of the one or more target devices 4 belonging to the second group, based on the second scheduling policy, the target device information, the allocation range information, the second reference information, and the first allocation information. The one or more target devices 4 belonging to the second group are identified by the target device information. More specifically, the allocation determination unit 63 first determines the remaining communication blocks that are obtained by excluding the communication blocks indicated by the first allocation information from the plurality of communication blocks within the allocation range. The plurality of communication blocks within the allocation range are identified by the allocation range information. The communication blocks indicated by the first allocation information are communication blocks already determined to be allocated to the one or more target devices 4 belonging to the first group. The allocation determination unit 63 executes processing of determining, based on the second reference information, which of the remaining communication blocks are to be allocated to which of the one or more target devices 4 belonging to the second group according to the second scheduling policy. Note that this processing is, for example, processing to which the second algorithm is applied. The allocation determination unit 63 determines, based on the second reference information, which of the remaining communication blocks are to be allocated to which of the one or more target devices 4 belonging to the second group by using, for example, the exhaustive search, the machine learning, or the solver that calculates a solution of the QUBO problem.

The allocation determination unit 63 generates allocation information (second allocation information) indicative of the determined allocation of the communication blocks. The second allocation information may include information indicating at least one of the orthogonal modulation scheme, the transmission power, the coding rate, or the propagation channel matrix to be used in the massive MIMO scheme. The orthogonal modulation scheme, the transmission power, and the coding rate are set for data included in each communication block, for example. The propagation channel matrix is set for each of the one or more target devices 4, for example. The allocation determination unit 63 notifies the control device 32 of the generated second allocation information.

With the above configuration, the second allocation determination device 6 can provide the second allocation information to the control device 32 within the second execution period in response to receiving of the second allocation request from the control device 32.

Note that the communication resources whose allocation is determined by the first allocation determination device 5 and the second allocation determination device 6 may be communication resources other than the communication blocks. Examples of the communication resources other than the communication blocks include antennas, codes, power, and orbital angular momentum (OAM).

Figure 10:
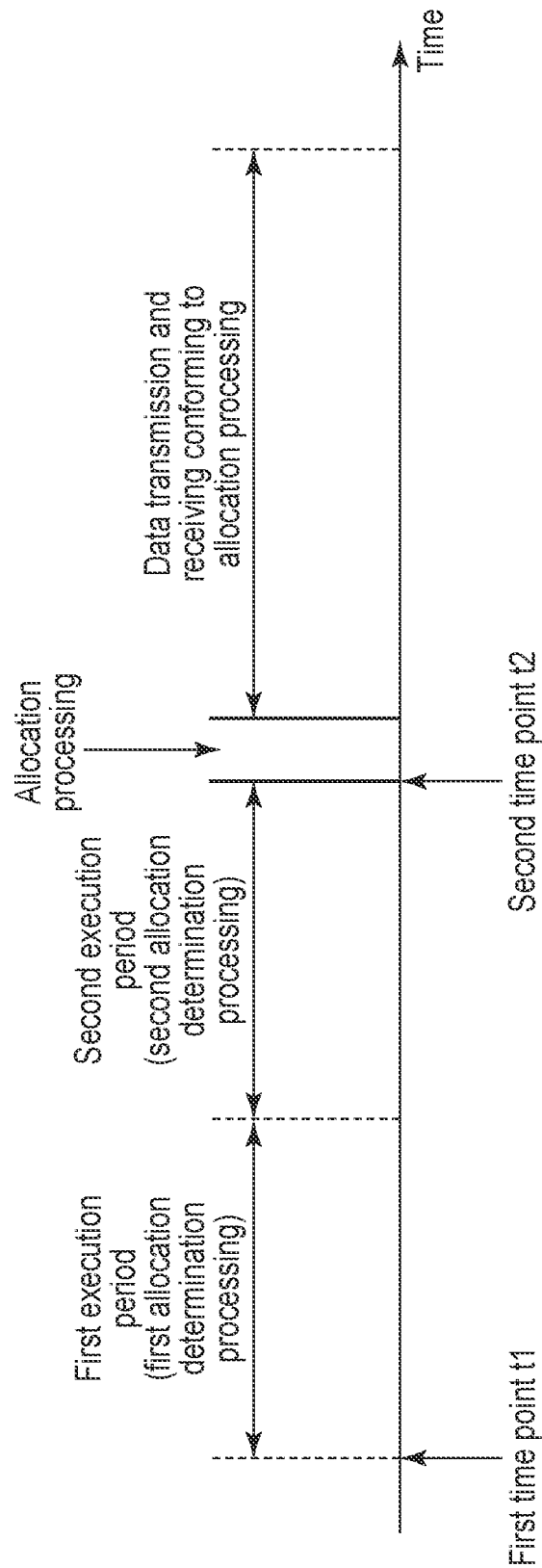
FIG. 10 is a view illustrating an example of timings related to allocation of communication resources in the wireless communication system according to the embodiment.

FIG. 10 is a view illustrating an example of timings related to allocation of communication resources. The first time point t1 and the second time point t2 are time points determined in advance by scheduling. For example, the first time point t1 is a time point at which the allocation determination processing is started. The second time point t2 is, for example, a time point at which the allocation processing is started. The second time point t2 is a time point later than the first time point t1.

The allocation determination processing is processing of selecting one or more terminal devices 4 (one or more target devices 4) to which communication blocks are to be allocated at the second time point t2 and determining allocation of communication blocks to each target device 4 for each of groups to which the one or more target devices 4 belong. The allocation processing is processing of allocating communication blocks to each target device 4, based on the allocation of communication blocks determined in the allocation determination processing. After the allocation processing is completed, each target device 4 performs data transfer with the communication device 31 by using the allocated communication blocks.

The allocation determination processing is completed within a period from the first time point t1 to the second time point t2.

More specifically, the allocation determination processing includes the first allocation determination processing and the second allocation determination processing. The first allocation determination processing is processing in which the first allocation determination device 5 determines communication blocks to be allocated to each target device 4 belonging to the first group and generates first allocation information. The second allocation determination processing is processing in which the second allocation determination device 6 determines communication blocks to be allocated to each target device 4 belonging to the second group and generates second allocation information.

The first execution period is an upper limit of the execution period of the first allocation determination processing. In other words, the first allocation determination device 5 completes the first allocation determination processing within the first execution period.

The second execution period is an upper limit of the execution period of the second allocation determination processing. In other words, the second allocation determination device 6 completes the second allocation determination processing within the second execution period.

A sum of the first execution period and the second execution period corresponds to, for example, a period from the first time point t1 to the second time point t2. The sum of the first execution period and the second execution period is a period based on the slot length. More specifically, the sum of the first execution period and the second execution period is the same as, for example, the slot length. In addition, the sum of the first execution period and the second execution period may be the same as an integral multiple of the slot length. Alternatively, the sum of the first execution period and the second execution period may be equal to or shorter than the slot length.

As a case where the sum of the first execution period and the second execution period is equal to or shorter than the slot length, for example, there is a case where a third allocation determination processing is further executed between the first time point t1 and the second time point t2. The third allocation determination processing is, for example, processing of determining communication blocks to be allocated to each target device 4 belonging to a third group and generating third allocation information. The third allocation determination processing is completed within a third execution period, for example. In addition, a sum of the first execution period, the second execution period, and the third execution period is the same as, for example, the slot length. In this manner, the allocation determination processing corresponding to a group different from the first group and the second group may be further performed from the first time point t1 to the second time point t2. In this case, the execution period of the allocation determination processing by each allocation determination device is determined such that the allocation determination processing corresponding to all the groups is completed from the first time point t1 to the second time point t2.

FIG. 11 is a view illustrating a setting example of the first time point and the second time point.

In a case where the control device 32 executes the allocation processing for each predetermined number of slots, the first time point t1 is a time point before a predetermined number of slots on which the allocation processing is to be performed. The predetermined number of slots is, for example, one slot. The first time point t1 may be a start time point of a slot or may be a time point shifted a predetermined period before or after the start time point of the slot.

For example, the first time point t1 and the second time point t2 may be time points asynchronous with subframes. For example, the first time point t1 and the second time point t2 may be time points set in accordance with occurrence of a predetermined event. Specifically, the control device 32 (for example, the terminal selection unit 321) may determine a time point at which a predetermined amount or more of downlink data is accumulated in the communication device 31 or a time point at which a predetermined amount or more of reservation requests for transmission/receiving allocation are accumulated, as the first time point t1. In a case where the time point at which the predetermined event occurs is set as the first time point t1, the control device 32 may set, for example, a time point after a predetermined period from the first time point as the second time point t2. Alternatively, in a case where the time point at which the predetermined event occurs is set as the first time point t1, the control device 32 may set, for example, a start time point of a subframe immediately after the first time point t1 or a time point shifted a predetermined period before the start time point of the subframe immediately after the first time point t1, as the second time point.

The period from the first time point t1 to the second time point t2 is, for example, a period based on the slot length.

Next, an example of allocation of communication blocks to the one or more target devices 4 will be described with reference to FIGS. 12 and 13. The allocation of communication blocks to each target device 4 belonging to the first group (URLLC) among the one or more target devices 4 is determined by the first allocation determination device 5. The allocation of communication blocks to each target device 4 belonging to the second group (eMBB) among the one or more target devices 4 is determined by the second allocation determination device 6.

Here, a case where (1) the allocation range includes a period corresponding to 14 OFDM symbols (that is, one slot) and a frequency band corresponding to 18 resource block groups, and (2) five target devices 4 are included in each of the first group and the second group will be exemplified. In other words, the allocation range includes 252 (=14×18) resource block groups. It is assumed that each of the 252 resource block groups is allocated as one communication block. It should be noted that the 252 resource block groups may also include resource block groups that are used for transfer of control information and are not available for data transfer, but resource block groups to be used for transfer of control information are not considered in this example. The five target devices 4 belonging to the first group are referred to as first to fifth target devices 4. The five target devices 4 belonging to the second group are referred to as sixth to tenth target devices 4.

Figure 12:
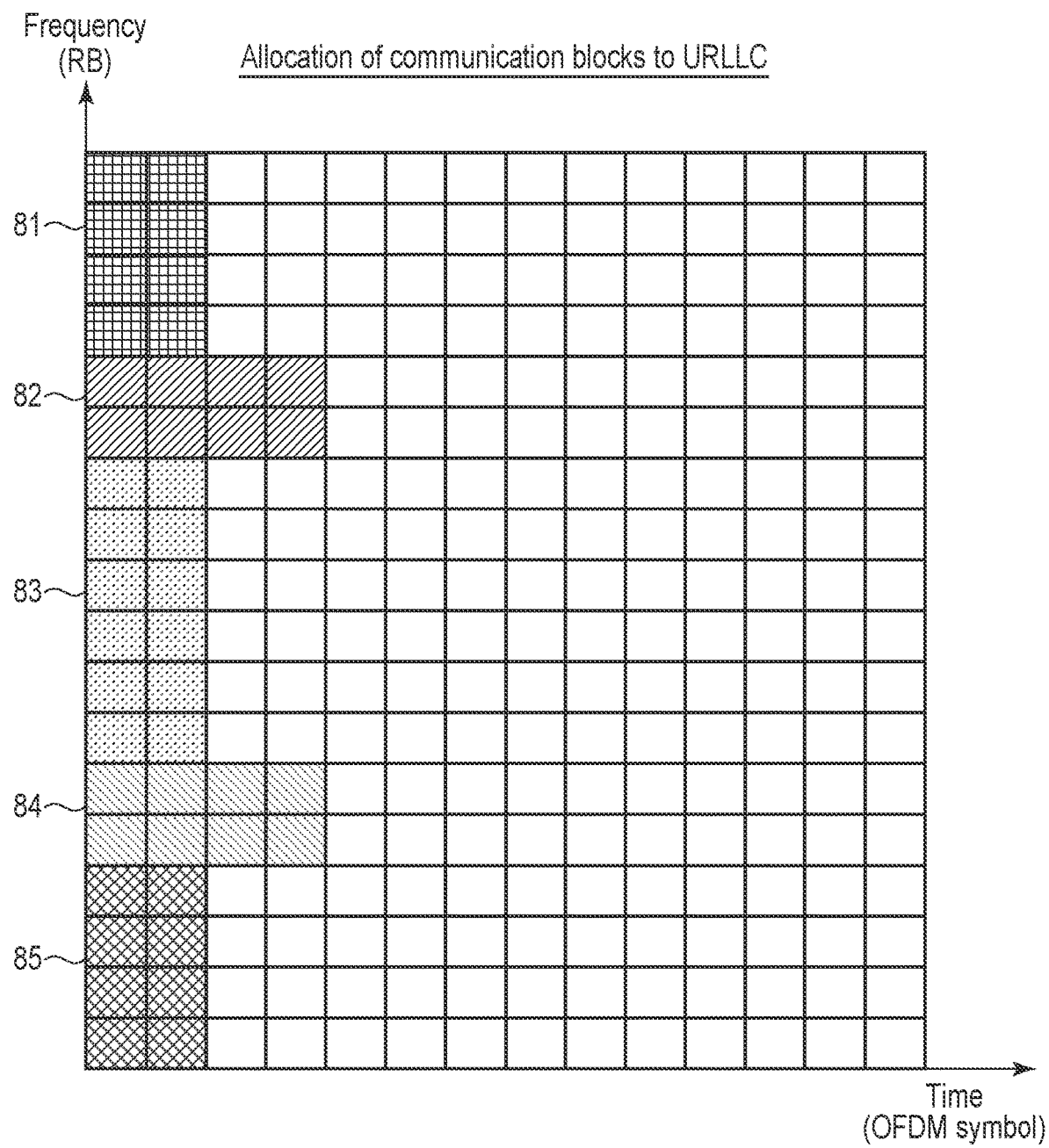
FIG. 12 is a view illustrating an example of allocation of communication blocks determined by the first allocation determination device in the wireless communication system according to the embodiment.

FIG. 12 illustrates an example of allocation of communication blocks determined by the first allocation determination device 5. Here, allocation of communication blocks to the first to fifth target devices 4 belonging to the first group has been determined.

Communication blocks located as early as possible in the time direction are allocated to the first to fifth target devices 4. In the example illustrated in FIG. 12, communication blocks located at the first to fourth positions in the time direction are allocated to the first to fifth target devices 4.

Specifically, eight communication blocks 81 at the first to second positions in the time direction are allocated to the first target device 4. Eight communication blocks 82 at the first to fourth positions in the time direction are allocated to the second target device 4. 12 communication blocks 83 at the first to second positions in the time direction are allocated to the third target device 4. Eight communication blocks 84 at the first to fourth positions in the time direction are allocated to the fourth target device 4. Eight communication blocks 85 at the first to second positions in the time direction are allocated to the fifth target device 4.

In each target device 4 of URLLC belonging to the first group, the tolerable latency is short, and thus, for example, the allocation of communication blocks is determined so that all requested data can be transmitted within the tolerable latency or within one slot. With such allocation, the target devices 4 of URLLC belonging to the first group can perform data transfer with low-latency.

Figure 13:
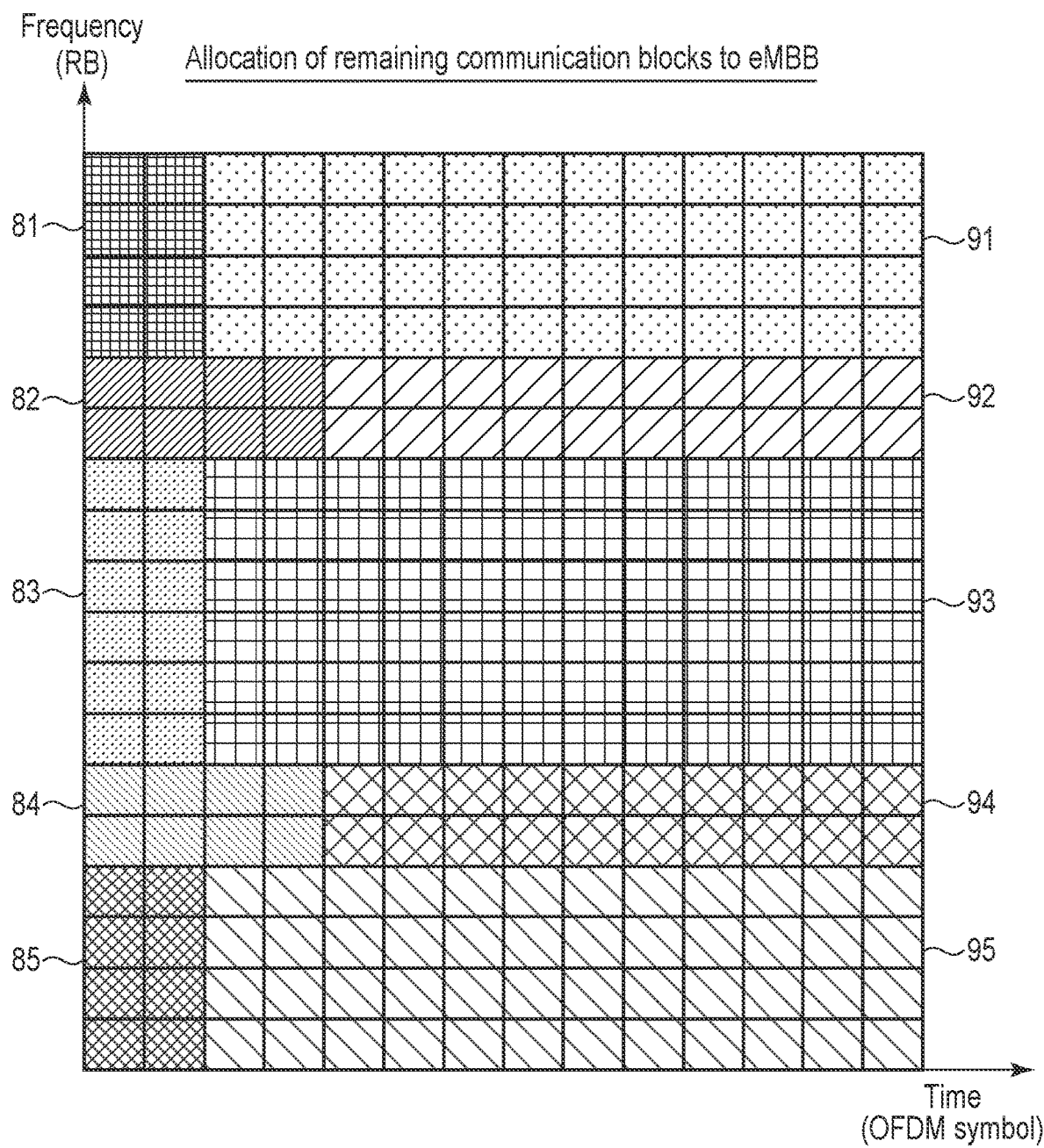
FIG. 13 is a view illustrating an example of allocation of communication blocks determined by the second allocation determination device in the wireless communication system according to the embodiment.

FIG. 13 illustrates an example of allocation of communication blocks determined by the second allocation determination device 6. Here, allocation of communication blocks to the sixth to tenth target devices 4 belonging to the second group has been determined.

The remaining communication blocks that are obtained by excluding the communication blocks already determined to be allocated to the first to fifth target devices 4 belonging to the first group from the communication blocks within the allocation range are allocated to the sixth to tenth target devices 4.

Specifically, 48 communication blocks 91 at the third and subsequent positions in the time direction are allocated to the sixth target device 4. 20 communication blocks 92 at the fifth and subsequent positions in the time direction are allocated to the seventh target device 4. 72 communication blocks 93 at the third and subsequent positions in the time direction are allocated to the eighth target device 4. 20 communication blocks 94 at the fifth and subsequent positions in the time direction are allocated to the ninth target device 4. 48 communication blocks 95 at the third and subsequent positions in the time direction are allocated to the tenth target device 4.

With such allocation, the target devices 4 of eMBB belonging to the second group can perform, for example, data transfer with large-capacity. Note that, the tolerable latency of each target device 4 of eMBB belonging to the second group is longer than that of each target device 4 of URLLC, and thus, all requested data does not have to be transferred within one slot, and may be transferred in the next slot. Thus, in a case where all the requested data has not been transferred within the slot corresponding to the current allocation range, allocation of communication blocks is further determined within a slot corresponding to the next allocation range.

Next, the procedure of processes executed in the base station 3, the first allocation determination device 5, and the second allocation determination device 6 will be described with reference to FIGS. 14 to 16.

Allocation Control Processing

Figure 14:
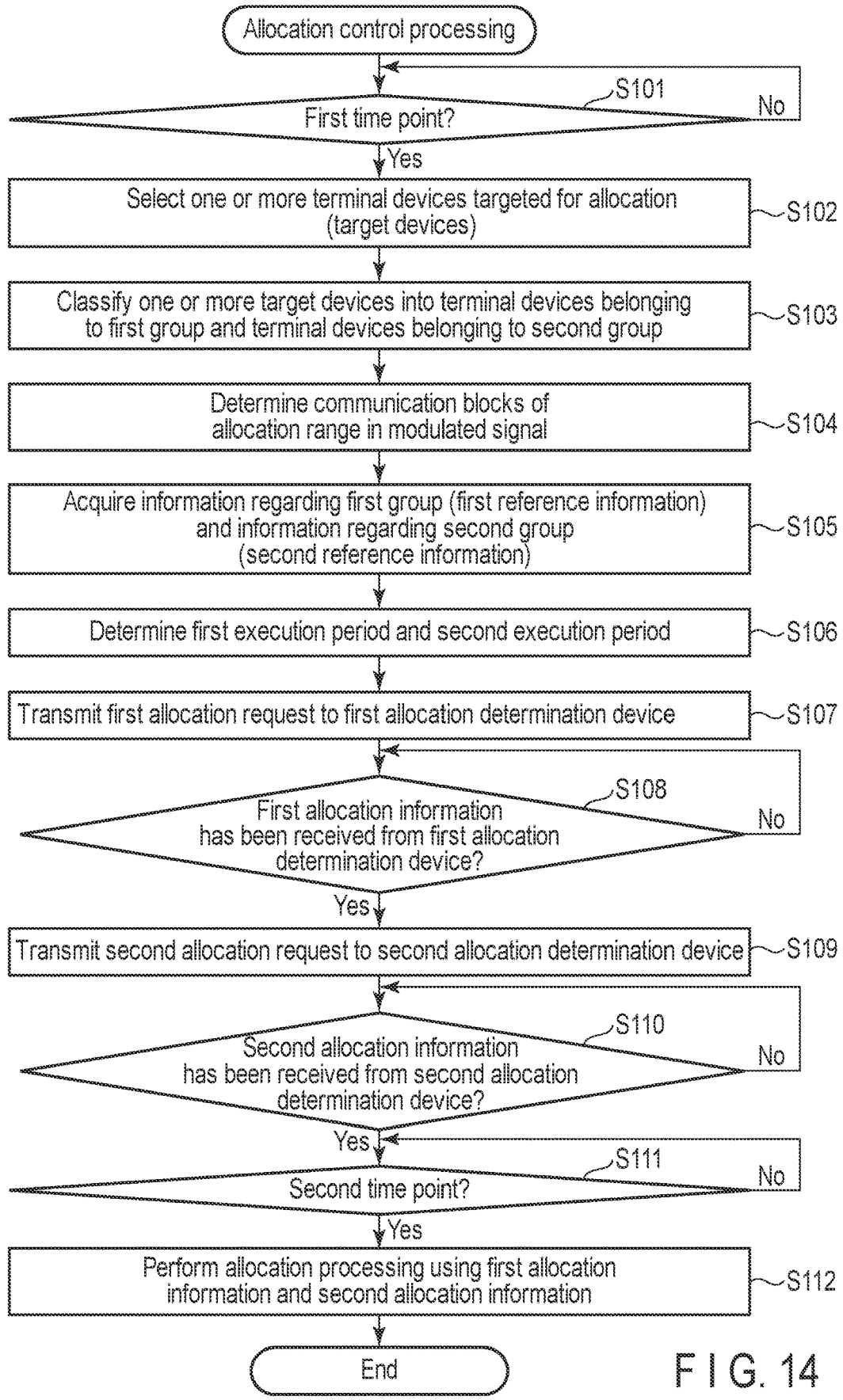
FIG. 14 is a flowchart illustrating an example of the procedure of allocation control processing that is executed in the control device in the wireless communication system according to the embodiment.

FIG. 14 is a flowchart illustrating an example of the procedure of the allocation control processing that is executed in the control device 32 of the base station 3. The allocation control processing is processing of acquiring the first allocation information and the second allocation information from the first time point to the second time point that are determined by scheduling, and allocating communication blocks to the terminal devices 4. The control device 32 starts the allocation control processing at the first time point or at a time point before the first time point. Here, it is assumed that the subcarrier spacing of communication blocks allocated to the terminal devices 4 is constant, that is, the slot length is constant.

Specifically, first, the control device 32 determines whether or not the current time point is the first time point (step S101). The control device 32 acquires the current time point by using, for example, the timer 76. When the current time point is a time point before the first time point (No in step S101), the processing by the control device 32 returns to step S101, and it is determined again whether or not the current time point is the first time point. In other words, the control device 32 waits until the current time point reaches the first time point.

When the current time point is the first time point (Yes in step S101), the control device 32 selects one or more terminal devices 4 (target devices 4) to which communication resources are to be allocated at the second time point, from the plurality of terminal devices 4 (step S102). The control device 32 classifies the one or more target devices 4 into target devices 4 belonging to the first group and target devices 4 belonging to the second group (step S103).

Further, the control device 32 determines communication blocks of an allocation range in the modulated signal (step S104). The communication blocks of the allocation range include, for example, a plurality of communication blocks after the second time point.

Next, the control device 32 acquires information regarding the first group (first reference information) and information regarding the second group (second reference information) (step S105). The first reference information includes reference information corresponding to each of one or more target devices 4 belonging to the first group. The second reference information includes reference information corresponding to each of one or more target devices 4 belonging to the second group.

The control device 32 determines a first execution period and a second execution period by using the acquired first reference information and second reference information, and the slot length (step S106). The first execution period is an upper limit of an execution period of processing for determining allocation of communication resources to the first group. The second execution period is an upper limit of an execution period of processing for determining allocation of communication resources to the second group. The control device 32 transmits an allocation request (first allocation request) that includes the target device information indicating the one or more target devices 4 belonging to the first group, the allocation range information indicating the allocation range, the first reference information, and the first execution period, to the first allocation determination device 5 (step S107). The information indicating the allocation range is information indicating the communication blocks of the allocation range determined in step S104.

Next, the control device 32 determines whether or not first allocation information has been received from the first allocation determination device 5 (step S108). When the first allocation information has not been received from the first allocation determination device 5 (No in step S108), the processing by the control device 32 returns to step S108, and it is determined again whether or not the first allocation information has been received from the first allocation determination device 5. In other words, the control device 32 waits until receiving the first allocation information from the first allocation determination device 5.

When the first allocation information has been received from the first allocation determination device 5 (Yes in step S108), the control device 32 transmits an allocation request (second allocation request) that includes the allocation range information, the target device information indicating the one or more target devices 4 belonging to the second group, the second reference information, the second execution period, and the first allocation information, to the second allocation determination device 6 (step S109). In a case where the first allocation information is transmitted from the first allocation determination device 5 to the second allocation determination device 6, the second allocation request does not have to include the first allocation information.

Next, the control device 32 determines whether or not second allocation information has been received from the second allocation determination device 6 (step S110). When the second allocation information has not been received from the second allocation determination device 6 (No in step S110), the processing by the control device 32 returns to step S110, and it is determined again whether or not the second allocation information has been received from the second allocation determination device 6. In other words, the control device 32 waits until receiving the second allocation information from the second allocation determination device 6.

When the second allocation information has been received from the second allocation determination device 6 (Yes in step S110), the control device 32 determines whether or not the current time point is the second time point (step S111). When the current time point is a time point before the second time point (No in step S111), the processing by the control device 32 returns to step S111, and it is determined again whether or not the current time point is the second time point. In other words, the control device 32 waits until the current time point reaches the second time point.

When the current time point is the second time point (Yes in step S111), the control device 32 performs the allocation processing using the first allocation information and the second allocation information (step S112) and ends the allocation control processing.

By the allocation control processing described above, the control device 32 can acquire the first allocation information and the second allocation information from the first time point to the second time point, which are determined by scheduling. As a result, the control device 32 can allocate communication blocks to the one or more target devices 4 belonging to the first group and the one or more target devices 4 belonging to the second group without latency.

First Allocation Determination Processing

Figure 15:
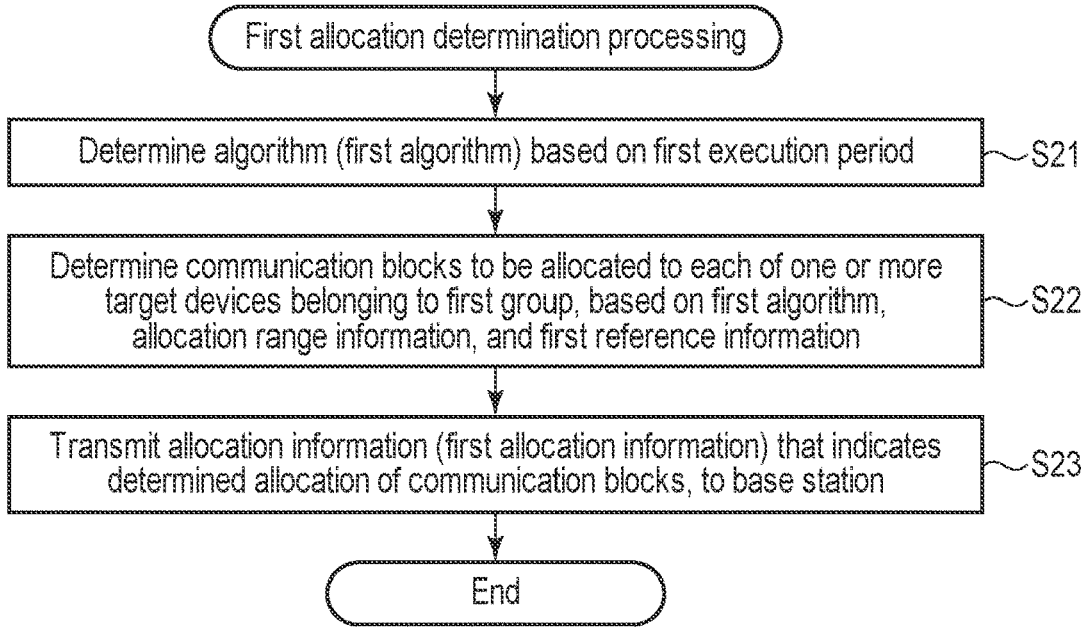
FIG. 15 is a flowchart illustrating an example of the procedure of first allocation determination processing that is executed in the first allocation determination device in the wireless communication system according to the embodiment.

FIG. 15 is a flowchart illustrating an example of the procedure of the first allocation determination processing that is executed in the first allocation determination device 5. The first allocation determination processing is processing of generating the first allocation information and notifying the control device 32 of the base station 3 of the first allocation information within the specified first execution period. The first allocation determination device 5 executes the first allocation determination processing in response to receiving of the first allocation request from the control device 32. The first allocation request includes, for example, the target device information, the allocation range information, the first reference information, and the first execution period.

First, the first allocation determination device 5 determines an algorithm (first algorithm) to be used for determining allocation of communication blocks, based on the first execution period (step S21).

The first allocation determination device 5 determines communication blocks to be allocated to each of the one or more target devices 4 belonging to the first group, based on the first algorithm, the target device information, the allocation range information, and the first reference information (step S22). More specifically, the first allocation determination device 5 executes processing of determining, based on the first reference information, which of the plurality of communication blocks within the allocation range are to be allocated to which of the one or more target devices 4 belonging to the first group according to the first scheduling policy. This processing is processing to which the first algorithm is applied.

Then, the first allocation determination device 5 transmits allocation information (first allocation information) that indicates the determined allocation of the communication blocks, to the control device 32 of the base station 3 (step S23) and ends the first allocation determination processing.

With the first allocation determination processing described above, the first allocation determination device 5 can generate the first allocation information and notify the control device 32 of the first allocation information within the specified first execution period. Specifically, the first allocation determination device 5 selects an algorithm in accordance with the first execution period, thereby notifying the control device 32 of the first allocation information within the first execution period.

Second Allocation Determination Processing

Figure 16:
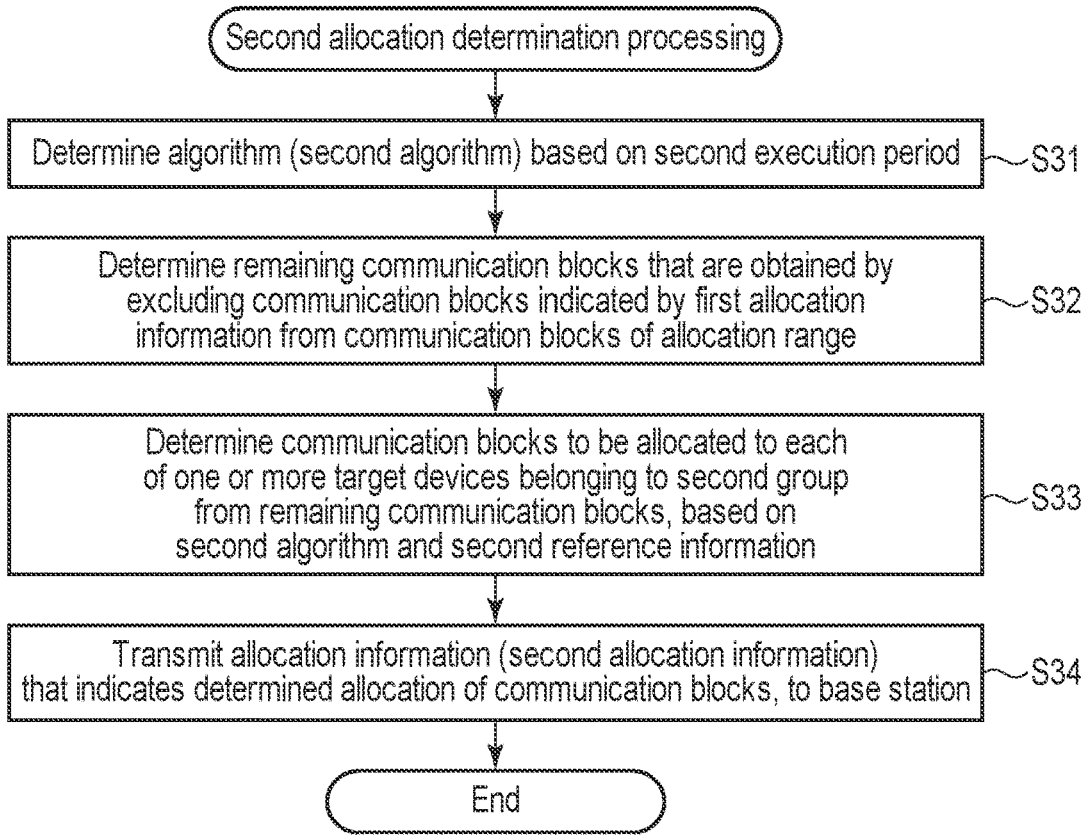
FIG. 16 is a flowchart illustrating an example of the procedure of second allocation determination processing that is executed in the second allocation determination device in the wireless communication system according to the embodiment.

FIG. 16 is a flowchart illustrating an example of the procedure of the second allocation determination processing that is executed by the second allocation determination device 6. The second allocation determination processing is processing of generating the second allocation information and notifying the control device 32 of the base station 3 of the second allocation information within the specified second execution period. The second allocation determination device 6 executes the second allocation determination processing in response to receiving of the second allocation request from the control device 32. The second allocation request includes, for example, the target device information, the allocation range information, the second reference information, the second execution period, and the first allocation information. In a case where the second allocation determination device 6 receives the first allocation information from the first allocation determination device 5, the second allocation request does not have to include the first allocation information.

First, the second allocation determination device 6 determines an algorithm (second algorithm) to be used for determining allocation of communication blocks, based on the second execution period (step S31). Then, the second allocation determination device 6 determines the remaining communication blocks that are obtained by excluding the communication blocks indicated by the first allocation information from the plurality of communication blocks within the allocation range (step S32). The communication blocks indicated by the first allocation information are communication blocks already determined to be allocated to the one or more target devices 4 that belong to the first group.

Next, the second allocation determination device 6 determines communication blocks to be allocated to each of the one or more target devices 4 that belong to the second group, from the remaining communication blocks on the basis of the second algorithm and the second reference information (step S33). More specifically, the second allocation determination device 6 executes processing of determining, based on the second reference information, which of the remaining communication blocks are to be allocated to which of the one or more target devices 4 belonging to the second group according to the second scheduling policy. This processing is processing to which the second algorithm is applied.

Then, the second allocation determination device 6 transmits allocation information (second allocation information) that indicates the determined allocation of the communication blocks, to the control device 32 of the base station 3 (step S34) and ends the second allocation determination processing.

With the second allocation determination processing described above, the second allocation determination device 6 can generate the second allocation information and notify the control device 32 of the second allocation information within the specified second execution period. Specifically, the second allocation determination device 6 selects an algorithm in accordance with the second execution period, thereby notifying the control device 32 of the second allocation information within the second execution period. The second allocation determination device 6 can determine communication blocks to be allocated to each of the one or more target devices 4 belonging to the second group from the remaining communication blocks not allocated to the target devices 4 belonging to the first group.

As described above, according to the present embodiment, communication resources can be allocated to a plurality of terminal devices that have different requirements, without latency. The base station 3 (more specifically, the control device 32) determines, based on a slot length, a first execution period for determining allocation of communication resources to a first group (for example, a URLLC group) to which one or more terminal devices 4 each having a first characteristic belong, and a second execution period for determining allocation of communication resources to a second group (for example, an EMBB group) to which one or more terminal devices 4 each having a second characteristic belong. The first allocation determination device 5 notifies the base station 3 of first allocation information that indicates communication resources allocated to each of the one or more terminal devices 4 belonging to the first group, within the first execution period on the basis of a first scheduling policy. After the base station 3 is notified of the first allocation information, the second allocation determination device 6 notifies the base station 3 of second allocation information that indicates communication resources allocated to each of the one or more terminal devices 4 belonging to the second group, within the second execution period on the basis of a second scheduling policy and the first allocation information. The base station 3 allocates communication resources to each of the one or more terminal devices 4 belonging to the first group on the basis of the first allocation information and allocates communication resources to each of the one or more terminal devices 4 belonging to the second group on the basis of the second allocation information.

In this manner, the base station 3 can acquire the first allocation information within the first execution period and can acquire the second allocation information within the second execution period. As a result, the base station 3 can allocate the communication resources to the one or more target devices 4 belonging to the first group and to the one or more target devices 4 belonging to the second group without latency.

Note that although in the wireless communication system 1 of the present embodiment, a case where the 5G system is used has been mainly exemplified, the configuration of the wireless communication system 1 can also be applied to cases where various wireless communication schemes such as long term evolution (LTE (registered trademark)), 6G, and a wireless local area network (wireless LAN) are used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An appendix related to the embodiment is further described below.

(1) A wireless communication system comprising:
a base station capable of wirelessly communicating with a plurality of terminal devices each having either a first characteristic or a second characteristic; a first allocation determination device configured to determine allocation of communication resources to at least one of the plurality of terminal devices; and a second allocation determination device configured to determine allocation of communication resources to at least another one of the plurality of terminal devices, wherein
the base station is configured to determine, based on a slot length, a first execution period for determining allocation of communication resources to a first group to which one or more terminal devices each having the first characteristic belong, and a second execution period for determining allocation of communication resources to a second group to which one or more terminal devices each having the second characteristic belong,
the first allocation determination device is configured to notify the base station of first allocation information based on a first policy within the first execution period, the first allocation information indicating communication resources to be allocated to each of the one or more terminal devices belonging to the first group,
the second allocation determination device is configured to notify the base station of second allocation information based on a second policy and the first allocation information within the second execution period after the base station is notified of the first allocation information, the second allocation information indicating communication resources to be allocated to each of the one or more terminal devices belonging to the second group, and
the base station is configured to:
allocate communication resources to each of the one or more terminal devices belonging to the first group, based on the first allocation information; and
allocate communication resources to each of the one or more terminal devices belonging to the second group, based on the second allocation information.

(2) The wireless communication system according to (1), wherein
a sum of the first execution period and the second execution period is based on the slot length.

(3) The wireless communication system according to (1) or (2), wherein
the base station is configured to determine the first execution period and the second execution period by using a number of the one or more terminal devices belonging to the first group and a number of the one or more terminal devices belonging to the second group.

(4) The wireless communication system according to any one of (1) to (3), wherein
the sum of the first execution period and the second execution period is equal to or shorter than the slot length.

(5) The wireless communication system according to any one of (1) to (4), wherein
the first allocation determination device is configured to:
receive the first execution period and information on the first group from the base station; and
notify the base station of the first allocation information within the first execution period, based on the first policy, the information on the first group, and a first algorithm.

(6) The wireless communication system according to (5), wherein
the first allocation determination device is configured to determine at least one of the first policy or the first algorithm, based on the received first execution period.

(7) The wireless communication system according to any one of (1) to (6), wherein the second allocation determination device is configured to:
receive the second execution period and information on the second group from the base station;
receive the first allocation information from the base station or the first allocation determination device; and
notify the base station of the second allocation information within the second execution period, based on the second policy, the information on the second group, the first allocation information, and a second algorithm.

(8) The wireless communication system according to (7), wherein
the second allocation determination device is configured to determine at least one of the second policy or the second algorithm, based on the received second execution period.

(9) The wireless communication system according to any one of (1) to (8), wherein
the base station is configured to:
select terminal devices to which communication resources are to be allocated from the plurality of terminal devices; and
classify the selected terminal devices into the first group to which terminal devices each having the first characteristic belong and the second group to which terminal devices each having the second characteristic belong.

(10) The wireless communication system according to any one of (1) to (9), wherein
a communication resource to be allocated to each of the one or more terminal devices belonging to the first group and a communication resource to be allocated to each of the one or more terminal devices belonging to the second group are each identified by time and a frequency.

(11) The wireless communication system according to any one of (1) to (10), wherein
the slot length is a period in which a specific number of symbols are transferred and is determined by the base station.

(12) A base station capable of wirelessly communicating with a plurality of terminal devices each having either a first characteristic or a second characteristic, the base station comprising:
a determination unit configured to determine, based on a slot length, a first execution period for determining allocation of communication resources to a first group to which one or more terminal devices each having the first characteristic belong, and a second execution period for determining allocation of communication resources to a second group to which one or more terminal devices each having the second characteristic belong;
an acquisition unit configured to:
acquire first allocation information based on a first policy within the first execution period, the first allocation information indicating communication resources to be allocated to each of the one or more terminal devices belonging to the first group; and acquire second allocation information based on a second policy and the first allocation information within the second execution period after acquiring the first allocation information, the second allocation information indicating communication resources to be allocated to each of the one or more terminal devices belonging to the second group; and
an allocation unit configured to:
allocate communication resources to each of the one or more terminal devices belonging to the first group, based on the first allocation information; and allocate communication resources to each of the one or more terminal devices belonging to the second group, based on the second allocation information.

(13) A non-transitory computer-readable storage medium having stored thereon a computer program which is executable by a computer capable of wirelessly communicating with a plurality of terminal devices each having either a first characteristic and a second characteristic, the computer program controlling the computer to execute functions of:
determining, based on a slot length, a first execution period for determining allocation of communication resources to a first group to which one or more terminal devices each having the first characteristic belong, and a second execution period for determining allocation of communication resources to a second group to which one or more terminal devices each having the second characteristic belong;
acquiring first allocation information based on a first policy within the first execution period, the first allocation information indicating communication resources to be allocated to each of the one or more terminal devices belonging to the first group; acquiring second allocation information based on a second policy and the first allocation information within the second execution period after acquiring the first allocation information, the second allocation information indicating communication resources to be allocated to each of the one or more terminal devices belonging to the second group;
allocating communication resources to each of the one or more terminal devices belonging to the first group, based on the first allocation information; and
allocating communication resources to each of the one or more terminal devices belonging to the second group, based on the second allocation information.

What is claimed is:
1. A wireless communication system comprising:
a base station wirelessly communicating with a plurality of terminal devices each having either a first characteristic or a second characteristic;
a first allocation determination device configured to determine allocation of communication resources to at least one of the plurality of terminal devices; and
a second allocation determination device configured to determine allocation of the communication resources to at least another one of the plurality of terminal devices,
wherein:
the base station is configured to determine, based on a slot length, a first execution period for determining allocation of the communication resources to a first group to which one or more terminal devices each having the first characteristic belong, and a second execution period for determining allocation of the communication resources to a second group to which one or more terminal devices each having the second characteristic belong,
the first allocation determination device is configured to notify the base station of first allocation information based on a first policy within the first execution period, the first allocation information indicating the communication resources to be allocated to each of the one or more terminal devices belonging to the first group,
the second allocation determination device is configured to notify the base station of second allocation information based on a second policy and the first allocation information within the second execution period after the base station is notified of the first allocation information, the second allocation information indicating the communication resources to be allocated to each of the one or more terminal devices belonging to the second group, and the base station is configured to:
   allocate the communication resources to each of the one or more terminal devices belonging to the first group, based on the first allocation information; and
   allocate the communication resources to each of the one or more terminal devices belonging to the second group, based on the second allocation information.

2. The wireless communication system according to claim 1, wherein a sum of the first execution period and the second execution period is based on the slot length.

3. The wireless communication system according to claim 2, wherein the base station is configured to determine the first execution period and the second execution period by using a number of the one or more terminal devices belonging to the first group and a number of the one or more terminal devices belonging to the second group.

4. The wireless communication system according to claim 2, wherein the sum of the first execution period and the second execution period is equal to or shorter than the slot length.

5. The wireless communication system according to claim 1, wherein the first allocation determination device is configured to:
   receive the first execution period and information on the first group from the base station; and
   notify the base station of the first allocation information within the first execution period, based on the first policy, the information on the first group, and a first algorithm.

6. The wireless communication system according to claim 5, wherein the first allocation determination device is configured to determine at least one of the first policy or the first algorithm, based on the received first execution period.

7. The wireless communication system according to claim 5, wherein the second allocation determination device is configured to:
   receive the second execution period and information on the second group from the base station;
   receive the first allocation information from the base station or the first allocation determination device; and
   notify the base station of the second allocation information within the second execution period, based on the second policy, the information on the second group, the first allocation information, and a second algorithm.

8. The wireless communication system according to claim 7, wherein the second allocation determination device is configured to determine at least one of the second policy or the second algorithm, based on the received second execution period.

9. The wireless communication system according to claim 1, wherein the base station is configured to:
   select terminal devices to which the communication resources are to be allocated from the plurality of terminal devices; and
   classify the selected terminal devices into the first group to which terminal devices each having the first characteristic belong and the second group to which terminal devices each having the second characteristic belong.

10. The wireless communication system according to claim 1, wherein a communication resource to be allocated to each of the one or more terminal devices belonging to the first group and a communication resource to be allocated to each of the one or more terminal devices belonging to the second group are each identified by time and a frequency.

11. The wireless communication system according to claim 1, wherein the slot length is a period in which a specific number of symbols are transferred and is determined by the base station.

12. A base station wirelessly communicating with a plurality of terminal devices each having either a first characteristic or a second characteristic, the base station comprising:
   a determination unit configured to determine, based on a slot length, a first execution period for determining allocation of communication resources to a first group to which one or more terminal devices each having the first characteristic belong, and a second execution period for determining allocation of the communication resources to a second group to which one or more terminal devices each having the second characteristic belong;
   an acquisition unit configured to:
      acquire first allocation information based on a first policy within the first execution period, the first allocation information indicating the communication resources to be allocated to each of the one or more terminal devices belonging to the first group; and
      acquire second allocation information based on a second policy and the first allocation information within the second execution period after acquiring the first allocation information, the second allocation information indicating the communication resources to be allocated to each of the one or more terminal devices belonging to the second group; and
   an allocation unit configured to:
      allocate the communication resources to each of the one or more terminal devices belonging to the first group, based on the first allocation information; and
      allocate the communication resources to each of the one or more terminal devices belonging to the second group, based on the second allocation information.

13. A non-transitory computer-readable storage medium having stored thereon a computer program which is executable by a computer wirelessly communicating with a plurality of terminal devices each having either a first characteristic and a second characteristic, the computer program controlling the computer to execute functions comprising:
   determining, based on a slot length, a first execution period for determining allocation of communication resources to a first group to which one or more terminal devices each having the first characteristic belong, and a second execution period for determining allocation of the communication resources to a second group to which one or more terminal devices each having the second characteristic belong;
   acquiring first allocation information based on a first policy within the first execution period, the first allocation information indicating the communication resources to be allocated to each of the one or more terminal devices belonging to the first group;
   acquiring second allocation information based on a second policy and the first allocation information within the second execution period after acquiring the first allocation information, the second allocation information indicating the communication resources to be allocated to each of the one or more terminal devices belonging to the second group;

allocating the communication resources to each of the one or more terminal devices belonging to the first group, based on the first allocation information; and allocating the communication resources to each of the one or more terminal devices belonging to the second group, based on the second allocation information.

* * * * *